United States Patent
Hamidi

(10) Patent No.: US 12,527,889 B2
(45) Date of Patent: Jan. 20, 2026

(54) SYSTEM AND METHOD FOR MAINTAINING STERILE FIELDS IN A MONITORED ENCLOSURE

(71) Applicant: Sophie S. Hamidi, Newport Coast, CA (US)

(72) Inventor: Sophie S. Hamidi, Newport Coast, CA (US)

(73) Assignee: Sophie S. Hamidi, Newport Coast, CA (US)

( * ) Notice: Subject to any disclaimer, the term of this patent is extended or adjusted under 35 U.S.C. 154(b) by 788 days.

(21) Appl. No.: 17/743,823

(22) Filed: May 13, 2022

(65) Prior Publication Data

US 2023/0364290 A1  Nov. 16, 2023

(51) Int. Cl.
*A61L 2/28* (2006.01)
*G16H 40/20* (2018.01)
*G16Y 10/60* (2020.01)
*G16Y 20/00* (2020.01)

(52) U.S. Cl.
CPC ........... *A61L 2/28* (2013.01); *G16H 40/20* (2018.01); *A61L 2202/14* (2013.01); *A61L 2202/24* (2013.01); *G16Y 10/60* (2020.01); *G16Y 20/00* (2020.01)

(58) Field of Classification Search
CPC .... A61L 2/28; A61L 2202/14; A61L 2202/24; G16H 40/20; G16H 40/63; G16H 40/67; G16H 20/40
See application file for complete search history.

(56) References Cited

U.S. PATENT DOCUMENTS

| | | | | |
|---|---|---|---|---|
| 6,608,551 B1* | 8/2003 | Anderson | ........... | G06K 7/0008 340/572.1 |
| 6,798,118 B1* | 9/2004 | Wen | ........... | H02N 2/166 310/323.02 |
| 2002/0193950 A1* | 12/2002 | Gavin | ........... | H01J 49/0036 702/28 |
| 2003/0195383 A1* | 10/2003 | Yoon | ........... | A61M 21/00 600/27 |
| 2004/0026638 A1* | 2/2004 | Schmidt | ........... | G01N 21/9054 209/523 |
| 2004/0228000 A1* | 11/2004 | Ikeda | ........... | B82Y 20/00 359/642 |
| 2012/0154582 A1* | 6/2012 | Johnson | ........... | G06Q 10/00 340/521 |

(Continued)

*Primary Examiner* — Kambiz Abdi
*Assistant Examiner* — Robert Anthony Skrobarczyk
(74) *Attorney, Agent, or Firm* — CHIP LAW GROUP

(57) ABSTRACT

A system is provided for maintaining sterile fields in a monitored enclosure. Multi-modal sensor data associated with a subject performing a plurality of actions within a monitored enclosure is correlated. The multi-modal sensor data is received at defined time intervals from a plurality of sensing devices located within the monitored enclosure. The subject is authorized to selectively perform a set of designated tasks based on contextual analysis of the correlated multi-modal sensor data, the set of parameters retrieved from a data store, and/or a set of activities performed by the subject. A notification is generated, via a portable device associated with an unauthorized subject, based on detection of an event associated with an unauthorized action performed by the unauthorized subject.

22 Claims, 7 Drawing Sheets

(56) References Cited

U.S. PATENT DOCUMENTS

| | | | |
|---|---|---|---|
| 2014/0081659 A1* | 3/2014 | Nawana | G16H 10/20 |
| | | | 705/3 |
| 2017/0245945 A1* | 8/2017 | Zuhars | A61B 90/39 |
| 2022/0399105 A1* | 12/2022 | Wagner Block | G16H 40/20 |
| 2023/0067796 A1* | 3/2023 | Roh | A61B 5/7267 |
| 2023/0402166 A1* | 12/2023 | Tiwary | A61B 90/361 |

* cited by examiner

SYSTEM AND METHOD FOR MAINTAINING STERILE FIELDS IN A MONITORED ENCLOSURE

CROSS-REFERENCE TO RELATED APPLICATIONS/INCORPORATION BY REFERENCE

None.

FIELD OF TECHNOLOGY

Certain embodiments of the disclosure relate to a control system. More specifically, certain embodiments of the disclosure relate to a system and method for maintaining sterile fields in a monitored enclosure.

BACKGROUND

Contamination control is one of the most important assets in various critical sectors, such as healthcare, pharmaceutical, life sciences laboratories, industrial kitchens, food service providers, manufacturing areas, electronic component assembly areas, to name a few. In general, contamination control may correspond to all the sterilization activities, such as disinfecting and cleaning with chemicals and cleansing agents, which aim to permanently ensure a sufficient level of asepsis in a controlled facility. An example of the controlled facility may be an operating room in a healthcare facility. Another example of the controlled facility may be a laboratory or pharmaceutical production and packaging unit in a pharmaceutical industry. Yet another example of the controlled facility may be food preparation and packaging units in a food processing industry. The sterilization activities, as introduced above, may create aseptic barriers between all concerned assisting parties and object(s)-of-interest in different controlled facilities, such as surgical instrument trays in the operating room of a healthcare facility, a pharmaceutical product in the production unit of a pharmaceutical plant, or a food item in the packaging unit of a food processing facility.

Existing systems provide various approaches for maintaining sterile fields in a controlled facility. However, such systems are inefficient and unreliable, thus are prone to breaches at various levels that may be categorized in certain patterns, such as the ones that may be recognized immediately, shortly after, later, or not at all. Consequently, the aseptic barriers may be destroyed, and the object(s)-of-interest may get inadvertently exposed to contaminants, such as environmental opportunistic pathogens and airborne pathogens, resulting in adverse outcomes. For example, a patient may contract healthcare-acquired infections at the surgical site due to the use of unsterile medical tools. In another example, mass population may get infected and may experience various health-related issues due to consumption of contaminated food items. In yet another example, variability and degradation in pharmaceutical products may lead to loss of potency and increase in the levels of bacterial endotoxins in people taking contaminated medications. Therefore, existing systems lack a holistic approach for maintaining sterile fields making them likely to cause significant morbidity and/or mortality in humans, as well as produce an unnecessary burden and expense to the controlled facilities.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for maintaining sterile fields in a monitored enclosure, substantially as shown in and/or described in connection with at least one of the figures, as set forth more completely in the claims.

These and other advantages, aspects, and novel features of the present disclosure, as well as details of an illustrated embodiment thereof, will be more fully understood from the following description and drawings.

DETAILED DESCRIPTION OF THE DISCLOSURE

Certain embodiments of the disclosure may be found in a system and a method for maintaining sterile fields in a monitored enclosure. Strict adherence to various practice standards for creating a sterile filed for various object(s)-of-interest, such as surgical tools, food products, pharmaceutical drugs, is crucially important in achieving asepsis in the monitored enclosure. Thereafter, intelligently maintaining the sterile fields becomes utmost consequential so that any risk of site-acquired infections can be mitigated.

In accordance with various embodiments of the disclosure, a system is provided for maintaining sterile fields in a monitored enclosure. The system includes a memory for storing instructions and a processor for executing the instructions to perform operations. The operations may comprise correlation of multi-modal sensor data associated with a subject performing a set of activities within the monitored enclosure. The multi-modal sensor data may be received at defined time intervals from a plurality of sensing devices located within the monitored enclosure. The subject may be authorized to selectively perform a set of designated tasks based on contextual analysis of the correlated multi-modal sensor data, the set of parameters retrieved from a data store, and/or a set of activities performed by the subject. A notification may be generated, via the portable device, based on detection of an event associated with an unauthorized action performed by an unauthorized subject.

Figure 1:
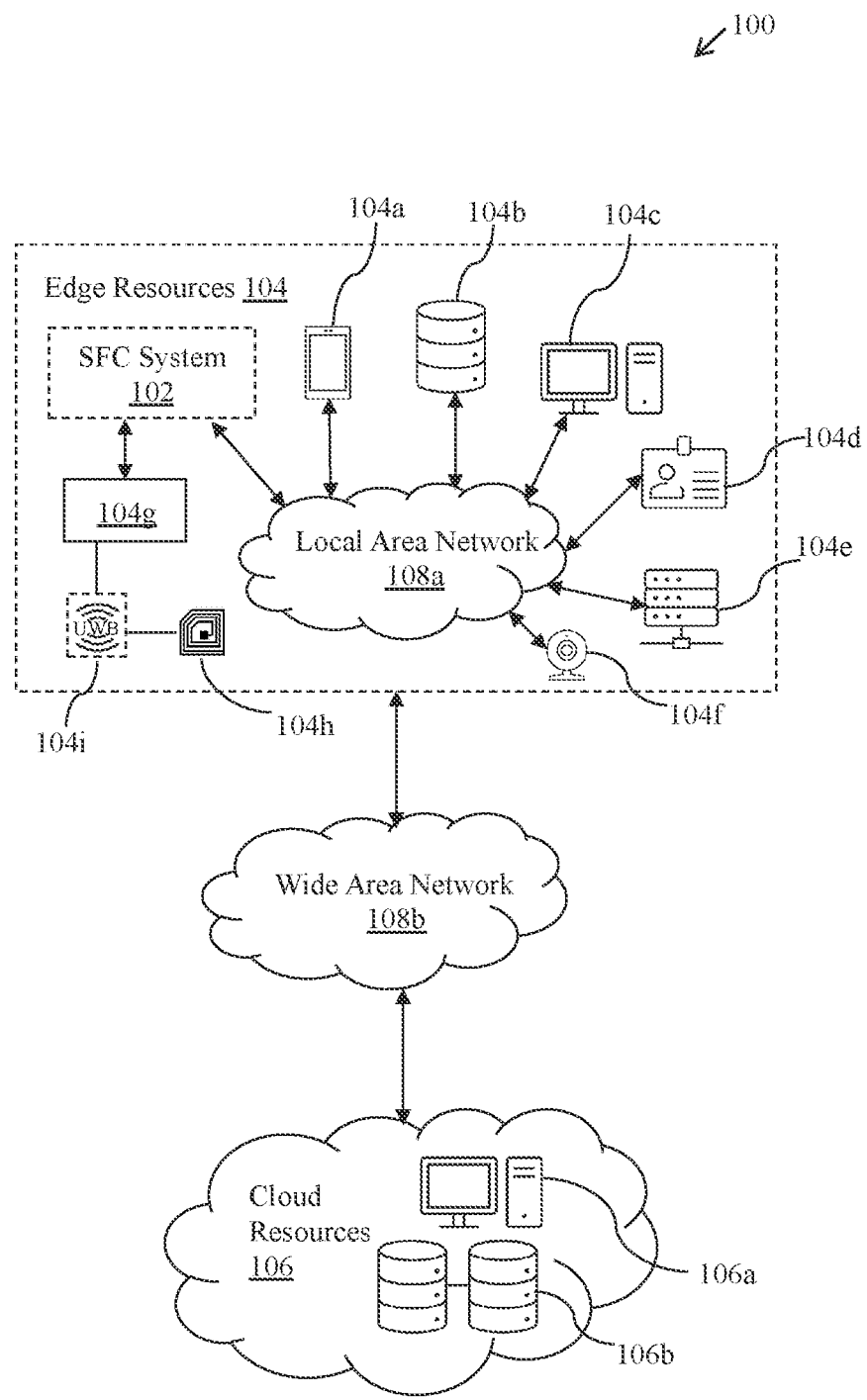
FIG. 1 is a block diagram that illustrates a computing environment for maintaining sterile fields in a monitored enclosure, in accordance with an exemplary embodiment of the disclosure.

FIG. 1 is a block diagram that illustrates a computing environment 100 for maintaining sterile fields in a monitored enclosure, in accordance with an exemplary embodiment of the disclosure. The computing environment 100 is shown to include a sterile field control (SFC) system 102, edge resources 104, cloud resources 106, and different communication networks (such as a local area network 108a and a wide area network 108b), as further discussed below. The edge resources 104 may communicate with each other and/or with other remote networks and resources (for example, cloud resources 106) through the communication networks, such as the local area network 108a and the wide area network 108b.

The SFC system 102 may comprise suitable logic, circuitry, and interfaces that may be configured to maintain sterile fields in a monitored enclosure, in accordance with an exemplary embodiment of the disclosure. The SFC system 102 may be powered by a machine learning (ML) engine and an artificial intelligence (AI) engine to simulate human thinking capability and behavior to allow learning from data without being programmed explicitly and to generate intelligent recommendations, respectively. The SFC system 102 may include various sub-systems, such as a surveillance system, an indoor positioning system, a smart tag system, and an access control system, communicatively connected with each other, via the local area network 108a and/or the wide area network 108b. In accordance with different embodiments, the functionality of the SFC system 102 may be partially or fully implemented by the various edge resources 104. The SFC system 102 may be implemented, based on a number of hardware and processor technologies, as further described in detail in FIG. 2.

The edge resources 104 may comprise suitable logic, circuitry, and interfaces that may be configured to collect and process multi-modal sensor data for the SFC system 102. The edge resources 104 may be considered part of the Internet-of-Things (IoT) having enough storage and computing capacity to make low latency decisions and process the multi-modal sensor data in milliseconds. The edge resources 104 may be interchangeably used with IoT devices that are located, deployed, and/or connected near a network edge that may correspond to a physical point at which the local area network 108a, such as an enterprise-owned network, connects to the wide area network 108b, such as a third-party network. Non limiting examples of the edge resources 104 may include personal electronic devices (such as a mobile phone 104a), local servers (such as a database server 104b and an application server 104c), wearable devices, such as lanyard IDs with embedded tags 104d, communication devices (such as edge gateways or routers 104e), sensing devices (such as cameras or vision sensors 104f), a positioning system 104g, and smart RFID tags 104h operating on a short-range communication protocol, such as ultrawideband (UWB) communication protocol 104i. It should be noted that the above instances of the edge resources 104 are merely for exemplary purposes. Other examples of the edge resources 104, such as routing switches, integrated access devices (IADs), multiplexers, a variety of metropolitan area network (MAN) and wide area network (WAN) access devices, and various assets, such as people, buildings, manufacturing facilities, retail facilities, network, or communication infrastructure, and any associated IoT devices, though not shown in FIG. 1 for brevity, may be possible without any deviation from the scope of the disclosure.

The edge resources 104 may communicate with each other and/or with other remote networks and resources (for example, the cloud resources 106) through one or more of the communication networks, such as the local area network 108a and/or the wide area network 108b. In accordance with an embodiment, the functionality of the SFC system 102 may be partially or fully implemented by various edge resources 104.

The cloud resources 106 may comprise various resources and/or services that may be hosted remotely over a network, which may otherwise be referred to as in the "cloud." In accordance with an embodiment, the cloud resources 106 may be remotely hosted on servers in a datacenter (for example, remote application servers 106a and remote database servers 106b). The resources, services, and/or functionality of the cloud resources 106 may be utilized by or for the edge resources 104.

In accordance with an embodiment, the cloud resources 106 may deliver cloud computing for the over the SFC system 102 over the wide area network 108b. Non limiting examples of the cloud resources 106 may include outsourced storage, processing power, databases, networking, analytics, artificial intelligence, mapping, navigation, geolocation services, network or infrastructure management, payment processing, audio and video streaming, messaging, social networking, news, and software applications. Thus, the cloud resources 106 may provide the SFC system 102 with flexible resources, faster innovation, and economies of scale.

The communication networks (such as the local area network 108a and the wide area network 108b) may comprise suitable logic, circuitry, and interfaces that may be configured to facilitate communication between different components, systems and/or sub-systems of the computing environment 100. In accordance with an embodiment, the edge resources 104 may be connected to the local area network 108a to facilitate communication with each other and/or other remote networks or resources, such as the cloud resources 106, via the wide area network 108b. In various embodiments, the computing environment 100 may be implemented using any number or type of communication networks.

The local area network 108a and the wide area network 108b may be configured to provide a plurality of network ports and a plurality of communication channels for transmission and reception of communication data. The communication data may correspond to data received and/or exchanged, via the local area network 108a and the wide area network 108b, among the edge resources 104 and the cloud resources 106. Each network port may correspond to a virtual address (or a physical machine address) for transmission and reception of the communication data. For example, the virtual address may be an Internet Protocol version 4 (IPV4) or an Internet Protocol version 6 (IPV6) address, and the physical address may be a media access control (MAC) address. The communication data may be transmitted or received via a communication protocol, the examples of which may include, but are not limited to, a short-range communication protocol (such as the UWB communication protocol 104i), a Hypertext Transfer Protocol (HTTP), a File Transfer Protocol (FTP), a Simple Mail Transfer Protocol (SMTP), a Domain Name Server (DNS) protocol, and a Common Management Information Protocol (CMIP) Over Transmission Control Protocol/Internet Protocol TCP/IP (CMOT).

The communication data may be transmitted or received via at least one communication channel of a plurality of communication channels. The communication channels may include, but are not limited to, a wireless channel, a wired channel, a combination of wireless and wired channel thereof. The wireless or wired channel may be associated with a data standard which may be defined by one of a Local Area Network (LAN), a Personal Area Network (PAN), a wireless personal LAN (WPLAN) (implemented based on UWB technology), a Wireless Local Area Network (WLAN), a Wireless Sensor Network (WSN), a Wireless Area Network (WAN), and a Wireless Wide Area Network (WWAN), the Internet, cellular networks, Wi-Fi networks, short-range networks (for example, Bluetooth® or Zig-Bee®), and/or any other wired or wireless communication networks or mediums. Additionally, the wired channel may be selected based on bandwidth criteria. For example, an optical fiber channel may be used for a high bandwidth communication, and a coaxial cable (or Ethernet-based communication channel) may be used for moderate bandwidth communication. In accordance with various embodiments, any, some, combination, or all of the systems, engines, and/or sub-systems of the computing environment 100 may be adapted to execute any operating system, such as Linux-based operating systems, UNIX-based operating systems, Microsoft Windows, Windows Server, MacOS, Apple iOS, Google Android, or other customized and/or proprietary operating system. The systems, engines, and/or sub-systems of the computing environment 100 may be adapted to execute such operating systems along with virtual machines adapted to virtualize execution of a particular operating system.

It should be noted that the communication between the various devices, systems and/or sub-systems, i.e. the SFC system 102, the edge resources 104, and the cloud resources 106, of the computing environment 100 may be dynamically established based on auto-selection of the most optimal network from various available communication networks provided by the local area network 108a and/or the wide area network 108b. The most optimal network may be automatically selected from the various available communication networks based on a plurality of network parameters. Non limiting examples of the plurality of network parameters may include link/signal quality, bandwidth, power, cost, throughput, security level, interference level, received signal strength, Quality of Service (QoS), network loads, distance, network connection time, network selection policy, and the like.

In case of any adverse or untoward event, such as network failure or degraded network performance, the next optimal network may be dynamically selected in a seamless manner such that the established communication is not interrupted. For example, communication between the SFC system 102 and other devices, such as the mobile phone 104a, the lanyard IDs with embedded tags 104d, the positioning system 104g, the smart RFID tags 104h, and the cameras or vision sensors 104f, may be established by means of a short-range communication protocol, such as the UWB communication protocol 104i. The UWB communication mode may be automatically selected for establishing the most optimal network connection due to various network parameters, such as location discovery, device ranging, limited interference, high frequency, low energy, high speed (about 1000 times faster than Bluetooth©), and the like. However, in certain scenarios, one or more challenges may be incurred due the usage of nanosecond-duration pulses for the UWB communication mode. Examples of such challenges may include significant distortion of weak and low-powered UWB pulses by transmission links, complex channel estimation due to severe pulse distortion, sub-optimal performance by analog-to-digital converters (ADCs), multi-access interference, and the like. In such scenarios, the next optimal communication network, such as Wi-Fi network, may be automatically selected for maintaining uninterrupted communication between the various devices, systems and/or sub-systems of the computing environment 100. In an embodiment, once the various network parameters for the UWB communication mode return to optimum levels, the UWB communication mode may be automatically selected, and the communication mode is switched from the current Wi-Fi network back to the UWB communication mode.

It should be noted that FIG. 1 is described herein as containing or being associated with a plurality of devices, systems and/or sub-systems. Nevertheless, not all the devices, systems and/or sub-systems illustrated within the computing environment 100 of FIG. 1 may be utilized in each alternative implementation of the present disclosure. Additionally, one or more of the devices, systems and/or sub-systems described in connection with the examples of FIG. 1 may be located external to computing environment 100. Further, certain systems and/or sub-systems illustrated in FIG. 1 may be combined with other components, as well as used for alternative or additional purposes in addition to those purposes described herein. Furthermore, certain devices and/or components illustrated in FIG. 1 may operate as standalone devices or may be integrated with, embedded within, or attached to other components. For example, the smart RFID tags 104h may be embedded within a passive device, for example a lanyard ID card, or an active device, such as the mobile phone 104a. Accordingly, it should be noted that the computing environment 100 of FIG. 1 may be implemented with any aspect of the various embodiments described throughout this disclosure.

In operation, the SFC system 102 may be configured to receive location data associated with a subject within the monitored enclosure from a first modality of sensing devices that correspond to an indoor positioning system. The indoor positioning system may correspond to at least one of an electromagnetic radiation-based system, sound-based system, radio frequency-based system, or non-radio frequency-based system. The SFC system 102 may be further configured to transform optical sensor data received from a second modality of sensing devices into a vector space to identify at least one of a gesture performed by the subject and a plurality of objects located within the monitored enclosure. The second modality of sensing devices may correspond to optical sensing devices. The SFC system 102 may be further configured to determine distance vectors based on distance data received from a third modality of sensing devices. The distance vectors may pertain to distance of the subject with respect to the sterile object within the monitored enclosure. The third modality of sensing devices may correspond to distance sensors installed at outer boundary of a sterile object within the monitored enclosure.

The SFC system 102 may be configured to correlate multi-modal sensor data associated with the subject checking into the monitored enclosure and performing a plurality of actions within the monitored enclosure. The multi-modal sensor data may be received at defined time intervals from the plurality of sensing devices, such as the first, the second, and the third modality of sensing devices, also referred to as modalities, located within the monitored enclosure. The plurality of actions may comprise a set of activities and a set of designated tasks.

In accordance with an embodiment, the SFC system 102 may be configured to train a classification model based on training datasets pertaining to a movement pattern or the plurality of actions derived from the correlated multi-modal sensor data. A prediction about likelihood of an input action being classified with an output classification label may be generated based on the trained classification model. In accordance with an embodiment, the SFC system 102 may be configured to recommend a corrective action to be taken corresponding to a non-compliant activity or a non-designated task performed by the subject based on a pre-defined sequence of activities and the set of parameters.

In accordance with an embodiment, the SFC system 102 may be configured to authorize the subject to selectively perform a set of designated tasks based on contextual analysis of the correlated multi-modal sensor data, the set of parameters retrieved from a data store, and/or a set of activities performed by the subject. The set of parameters may comprise pre-defined rules associated with each of the set of designated tasks retrieved from a data store, a list of responsibility exclusions defined for the subject, a set of protocols pertaining to responsibilities and duties defined for the subject in a workflow, and identification data and credentials read from the portable device associated with the subject.

In accordance with an embodiment, the SFC system 102 may be configured to generate a notification, via the portable device, based on detection of an event associated with an unauthorized action performed by an unauthorized subject. The unauthorized action performed by the unauthorized subject may correspond to at least one of a non-compliant activity and/or a non-designated task. In accordance with another embodiment, the notification may be generated further in response to a breach of an outermost sterile field around a sterile object in the monitored enclosure. The generated notification may be rendered in accordance with various alert levels. For example, in accordance with an embodiment, the generated notification may be rendered at the portable device at a basic alert level in accordance with a predefined mode. In accordance with another embodiment, the generated notification is rendered at the portable device and additional portable devices at advanced alert levels in response to breach of inner sterile fields around the sterile object. In accordance with various embodiments, the outermost sterile field and the inner sterile fields may be adjustable and defined dynamically. The outermost sterile field and the inner sterile fields may have a uniform or a non-uniform boundary.

It should be noted that the one or more of the systems for enclosure surveillance, indoor positioning, authorization, and notification generation, described in connection with the examples of FIG. 1 may be located as edge resources 104 within the computing environment 100 connected to each other via the local area network 108*a*. However, in other instances, such systems may be implemented as the cloud resources 106 connected to each other via the combination of the local area network 108*a* and the wide area network 108*b*. In yet other instances, certain systems may be included within or as a portion of one or more of the other described systems, as well as other systems not described in the illustrated implementation.

Figure 2:
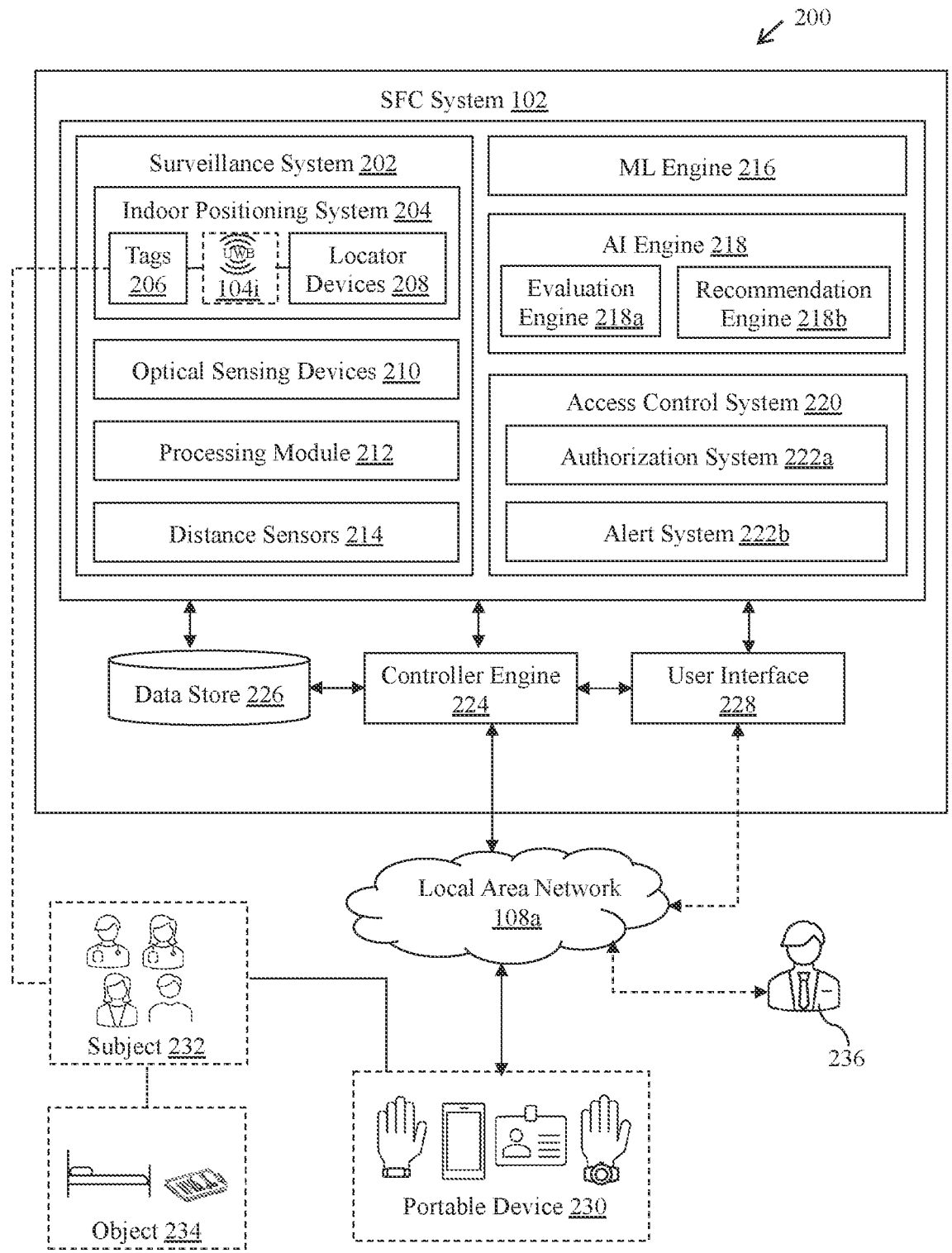
FIG. 2 is a block diagram that illustrates the various sub-systems of the sterile field control system, in accordance with an exemplary embodiment of the present disclosure.

FIG. 2 is a block diagram 200 that illustrates various sub-systems of the SFC system 102, in accordance with an exemplary embodiment of the present disclosure. With reference to the block diagram 200, there is shown a surveillance system 202 comprising an indoor positioning system 204 (comprising a set of tags 206 and a set of locator devices 208), optical sensing devices 210, and a processing module 212. There are further shown distance sensors 214, an ML engine 216, an AI engine 218, an access control system 220 (comprising an authorization system 222*a* and an alert system 222*b*), a controller engine 224, a data store 226, and a user interface 228. The controller engine 224 in the SFC system 102 may be communicatively coupled with a portable device 230 associated with a subject 232. The subject 232 may be authorized or unauthorized to touch or handle one or more objects, such as the object 234. In accordance with an exemplary embodiment as described herein forth, certain components of the SFC system 102, such as the set of tags 206 of the indoor positioning system 204, may be associated with the subject 232 either directly or through other devices for positioning and tracking purposes. The set of tags 206 may communicate with the locator devices 208 (of the indoor positioning system 204) in the SFC system 102, via the UWB communication protocol 104*i*, to enable a fast, precise (approximately 2 cm), high frequency with low power, accurate and short-range communication of positional (or locational) information with limited interference. Other sub-systems of the SFC system 102, such as the alert system 222*b* and the user interface 228, may be associated with the portable device 230 and an external sterile manager 236, respectively, via the local area network 108*a*. In accordance with various embodiments, the set of tags 206 may be embedded within or attached to different types of the portable device 230, such as a passive device (for example, a lanyard ID card), or an active device (for example, a smart phone).

The surveillance system 202 may comprise suitable logic, circuitry, and interfaces that may be configured to combine digital images and/or video streams captured by the optical sensing devices 210 and analyzed by various advanced techniques, such as computer vision techniques, with location data received from the indoor positioning system 204. Based on the combination, the surveillance system 202 may be configured for the purpose of identifying, tracking, and categorizing objects and subjects in the field-of-view of the optical sensing devices 210, either in real time or in retrospect.

In accordance with some embodiments, the components of the surveillance system 202 may be deployed as the edge resources 104. For example, in an embodiment, the indoor positioning system 204, optical sensing devices 210, the processing module 212 or other standalone processing devices, microprocessors, Field Programmable Gate Arrays (FPGAs) and Application-Specific Integrated Circuits (ASICs), and edge gateways of the surveillance system 202 may be deployed as the edge resources 104. In accordance with other embodiments, the components of the surveillance system 202 may be distributed across both the edge resources 104 and the cloud resources 106. For example, the optical sensing devices 210 and the indoor positioning system 204 may be deployed as the edge resources 104, and one or more processors or servers, such as the processing module 212 may be deployed exclusively as the cloud resources 106 or otherwise distributed across both the cloud resources 106 and the edge resources 104.

The indoor positioning system 204 may comprise suitable logic, circuitry, and interfaces that may be configured to collect observation data about the subject 232 and/or the object 234 by a modality of sensing devices, estimate range of distance to/from the subject 232 the object 234 that needs to be located (based on the collected observation data), and estimate a target location (or position) of the subject 232 and/or the object 234 based on the range estimation. In general, the indoor positioning system 204 includes the set of tags 206 and the set of locator devices 208. An exemplary tag from the set of tags 206 may be carried by the subject 232 to monitor its exact location. The exemplary tag may be equipped with a transmitter and may send out a ping signal for every location update. The internal clocks of the set of locator devices 208 may be synchronized with each other. In accordance with an embodiment, the set of locator devices 208 may have a range that may coincide, overlap, or otherwise may be correlated to the area of the monitored enclosure captured in the digital images and/or video streams by the optical sensing devices 210. The set of locator devices 208 then listens for the pinged signals from the set of tags 206. Once synchronized, the set of locator devices 208 may record the time when the pinged signal was received. Accordingly, the position of the exemplary tag may be determined at the set of locator devices 208 based on one or more parameters, such as time of flight (ToF), time difference of signal arrival (TDoA), received signal strength (RSS), time of arrival (ToA), angle of arrival (AoA), or the like. In accordance with various embodiment, the tag position may be estimated in a number of different coordinate systems, based on the purpose of an application. For instance, in outdoor navigation systems, the latitude and longitude may be associated with a spherical coordinate system, but, for indoor location, such as the monitored enclosure, a flat cartesian coordinate system may be implemented.

In accordance with various embodiments, the indoor positioning system 204 may correspond to at least one of an electromagnetic radiation-based system, sound-based system, radio frequency-based system, or non-radio frequency-based system. In an electromagnetic radiation-based system, the indoor positioning system 204 may implement visible light communication (VLC) technology. In VLC, each of fixed lamps deployed in an enclosure has different flicker encoding. The sensor, which may be carried by a user, receives the light from the fixed lamps and compares the modulation against known encoding schemes and determines which is the dominant one, thus associating the sensor location with the vicinity of the corresponding lamp.

In sound-based system, the indoor positioning system 204 may use ultrasonic frequencies higher than the audible range (i.e., beyond 20 KHz) to determine the location of the user based on the time taken for an ultrasonic signal to travel from a transmitter to a receiver.

In the non-radio frequency-based system, the indoor positioning system 204 may rely on naturally occurring signals, which do not contain any embedded information. In an example, magnetic fields may be artificially generated to determine the location of a person or object by using a magnetometer to measure magnetic field variations. In another example, inertial technology may be used to determine the location of the user based on a combined information received from devices, such as digital accelerometers and gyroscopes.

In the radio frequency-based system, the indoor positioning system 204 may employ radio signals restricted to a different range of frequencies for determining the location of the user. The radio frequency-based system may include various technologies, such as Wireless Local Area Network (WLAN), Bluetooth® low energy (BLE), Zigbee®, Radio Frequency Identification (RFID) and the UWB communication protocol.

The WLAN technology, also referred to as "Wi-Fi," is based on the IEEE 802.11 standards that links two or more devices using wireless communication to form a LAN within a limited area.

In Bluetooth®, digitally embedded information on radio frequency signals may be used to facilitate communication between mobile and fixed devices or two mobile devices and data synchronization between personal devices. Bluetooth® Low Energy (BLE) beacons are the hardware of BLE devices powering the transmission of broadcast signals and allowing the location and movement of the BLE devices to be tracked. BLE beacons may further allow location-based actions to be triggered when the BLE devices enter a certain area.

ZigBee® is composed of a network of sensors and wireless sensor network algorithms that may use received signal strength indicator (RSSI) values to estimate the location of the user, thus relying on the same techniques as Wi-Fi and Bluetooth®, that is, fingerprinting and propagation models.

In RFID, the indoor positioning system 204 may use radio waves to make a specialized circuit (attached to the subject 232 and the object 234) to generate a response containing a unique identifier and provide a method for identifying them. An RFID system consists of RFID readers and RFID tags (or RFID transponders). The RFID tags may be fitted with a microchip and a printed circuit board acting as an antenna, capable of emitting radio signals carrying information, mainly its unique ID. The RFID reader can pick the data emitted by the RFID tags. The RFID tags may be classified depending on how they get energy to respond to an RFID reader. For example, RFID tags may be "passive" if the tags answer back to the RFID reader using negligible energy emitted by the RFID reader. On the other hand, the RFID tags may be "active" if the tags have their own power supply and transmit periodically their ID signal.

The UWB communication protocol corresponds to a radio technology that refers to frequency bands greater than 500 MHz and uses an exceptionally low energy level for short-range, high-bandwidth communications over a sizable portion of the radio spectrum. Different measures, such as ToA, TDoA, and two way ranging (TWR), may be used in a UWB positioning system to determine the distance between a target and a reference point. The indoor positioning system 204 based on UWB may include UWB tags and UWB beacons installed across the monitored enclosure. The UWB beacons may be configured to perform wireless communication in any UWB bandwidth. The UWB tags may be configured to wirelessly communicate with the UWB beacons such that a computing device executing a control software, such as the controller engine 224 located/executed/hosted either as one of the edge resources 104 or the cloud resources 106 and in communication with the UWB beacons, may track the location of the UWB tag. In accordance with an embodiment, the processing and location determination may be alternatively and/or additionally performed at least partially in a distributed manner by the UWB beacons, the UWB tags and/or the control software executed by the controller engine 224 local to the monitored enclosure.

In accordance with an embodiment, the UWB beacons and the UWB tags may utilize a predefined modulation scheme, such as an orthogonal frequency division multiplexed (OFDM) modulation scheme, to transmit and/or receive UWB signal RF pulses. UWB uses low energy signals with a power of the order of −41.3 dBm/MHz for 1 to 100 short pulses per second on a wide frequency carrier signal (i.e., 3.1-10.6 GHz). The UWB technology may be beneficially utilized to detect the position of the UWB tags in two- or three-dimensional space within a 5-10 cm margin of error 1-10 times every second. In certain cases, the UWB beacons may include a wireless transceiver module to communicate, for example, ToF and/or TDoA data, to each other and/or location data of the UWB tags to the controller engine 224.

The optical sensing devices 210 may comprise suitable logic, circuitry, and interfaces that may be configured to capture digital images and/or video streams of various objects and subjects in the monitored enclosure. In accordance with an embodiment, the optical sensing devices 210 may include a plurality of cameras, communicatively coupled, or integrated with one or more processors. The optical sensing devices 210 may be mounted in the monitored enclosure such that its field-of-view (FOV) defines a scene within the monitored enclosure. In accordance with an embodiment, all the instances of the optical sensing devices 210 installed in the monitored enclosure may be intelligently synchronized with each other. The synchronization may be controlled by an integrated processing unit as one of the edge resources 104. Alternatively, the processing unit may be deployed as one of the cloud resources 106, communicatively coupled with the optical sensing devices 210, via the wide area network 108*b*. In accordance with an embodiment, the area of the monitored enclosure captured in the digital images and/or video streams by the optical sensing devices 210 may coincide, overlap, or otherwise may be correlated to a range of the set of locator devices 208 by the controller engine 224 in the SFC system 102.

In accordance with an embodiment, the optical sensing devices 210 may be stereoscopic cameras and thereby able to capture three-dimensional images of the various objects and subjects in the monitored enclosure. In accordance with another embodiment, optical sensing devices 210 may be adjustable such that the direction of the optical sensing devices 210 may be changed. For example, the optical sensing devices 210 may pan-tilt-zoom cameras. It should be noted that the optical sensing devices 210 may not be only limited to the stereoscopic or the pan-tilt-zoom cameras, and other types of specialized cameras, such as infrared/night vision closed-circuit television (CCTV) cameras, varifocal cameras, or day/night CCTV cameras may also be deployed in the monitored enclosure without deviating from the scope of the disclosure.

The processing module 212 may comprise suitable logic, circuitry, and interfaces that may be configured to process the digital images and/or video streams captured by the optical sensing devices 210 to generate metadata describing the current state of each object and subject within the FOVs of the optical sensing devices 210. The metadata may include, for example, physical characteristics, behavior, position, and the like pertaining to each object and subject within the monitored enclosure. Accordingly, the processing module 212 of the surveillance system 202 may be configured to predict next states of each object and subject. Based on the prediction, the processing module 212 may be proactively configured to control the optical sensing devices 210 and the indoor positioning system 204 efficiently. For example, the optical sensing devices 210 may be configured to intelligently capture the digital images and/or video streams based on the latest predictions generated by the processing module 212. Similarly, the indoor positioning system 204 may be configured to intelligently determine the location data based on the latest predictions generated by the processing module 212. In this manner, the surveillance system 202 may capture, identify, and/or track each object and subject with enhanced efficiency and accuracy by periodically synchronizing the timing and/or clocks of respective cameras of the optical sensing devices 210 and the receivers (or anchors) of the indoor positioning system 204.

In accordance with an exemplary embodiment, the device synchronization may be implemented using a dedicated network time protocol server that may be hosted as the edge resources 104 or the cloud resources 106 based on independent coordination among the devices, and/or using other feasible approaches, such as the precision time protocol.

The distance sensors 214 may comprise suitable logic, circuitry, and interfaces that may be used to determine the distance between two objects/subjects, such as between the subject 232 and the object 234 without any physical contact. The distance sensors 214 installed at an outer boundary of the object 234 may be configured to output a signal and measure a change when the signal returns. The change measured may be in the form of time taken for the signal to return from the subject 234, intensity of the returned signal, or phase/angle change of the returned signal. The distance sensors 214 may be one of ultrasonic sensors, IR distance sensors, laser distance sensor (such as light detection and ranging (LIDARs)), RADARs, ToF distance sensors, and the like.

The ML engine 216 may comprise suitable logic, circuitry, and interfaces that may be configured to provide SFC system 102 an ability to automatically learn and improve from experience without being explicitly programmed. Machine learning, as deployed by the ML engine 216, may focus on the development of computer programs that may access the correlated multi-modal sensor data, apply intelligent reasoning based on the correlated multi-modal sensor data, and generate educated decisions based on such reasoning. The ML engine 216 may implement one or more machine learning algorithms that may be configured to make inferences and determinations about the current workflow scenario in view of feedback received about the current workflow scenario and information provided by one or more information sources and/or the historical data referenced from the data store 226. In accordance with an embodiment, the ML engine 216 may facilitate the implementation of the AI engine 218 to automatically make determinations and inferences in each workflow and optimize the performance of the SFC system 102 in real-time.

The AI engine 218 may comprise suitable logic, circuitry, and interfaces that may be configured to learn from experience, adjust to new inputs and perform human-like intelligent tasks using output of the ML engine 216, thereby reducing or mitigating adverse outcomes of the SFC system 102. In this regard, using one or more types of machine learning algorithms and the data store 226, the AI engine 218 may learn all aspects of how the workflow should be organized to achieve optimal operational and financial outcomes. For example, the AI engine 218 may evaluate historical information that identifies tracked attributes related to the workflow events, evaluate information including but not limited to: standard operating procedure information corresponding to the given workflow, human resources data that identifies capabilities, performance, roles and responsibilities information for the subjects employed at the monitored enclosure, finance information that provides financial costs associated with different aspects of the given workflow, and inventory data that identifies available objects, such as supplies and equipment, within the monitored enclosure.

The AI engine 218 may include an evaluation engine 218*a* configured to evaluate the set of activities performed by the subject 232 and the set of tasks designated for the subject 232. For example, the evaluation engine 218*a* may evaluate a current scenario to identify issues and generate observations about the scenario to facilitate making more intelligent and informed decisions. In accordance with an embodiment, the evaluation engine 218a may perform various functionalities, such as event identification and risk assessment.

The event identification may include an event reflected in the correlated multi-modal sensor data, workflow data, and/or facility data, which warrants immediate attention and/or a rapid response. The event may be related to a single subject (such as the subject 232), a group of subjects, a single object (such as the object 234), a group of objects, a specific area of the monitored enclosure, or an entire area of the monitored enclosure. In general, the event may correspond to change in state, condition, or status of the subject 232, the group of subjects, the object 234, the group of objects, the specific area of the monitored enclosure, the entire area of the monitored enclosure, and the like, which warrants attention and/or a response.

The event may be defined as an occurrence of an incident within the monitored enclosure that is undesired and unauthorized. In accordance with an embodiment, from the perspective of the subject 232, an occurrence of an improper or an undesired performance of an activity or a task, a failure to perform an aspect of a set of designated tasks or an activity, or demonstration of a level of fatigue or attentiveness that is below a level required for provision of quality care may be considered as the event. In accordance with another embodiment, the event may correspond to the subject 232 performing or about to perform a procedure or steps that the subject 232 is not authorized to perform or that the subject 232 has demonstrated low proficiency in performing correctly. In accordance with an embodiment, the event may correspond to improper number and/or distribution of subjects within the monitored enclosure. In accordance with another embodiment, the event associated with the specific area, or the entire monitored enclosure may correspond to inadequate resources or distribution of resources, or malfunction of one or more objects that influence the ability to perform relevantly in the monitored enclosure.

It should be noted that the events described above are merely exemplary and many additional types of events associated with a specific application area, such as healthcare, may be considered that warrants immediate attention. Further, it should be noted that the events may involve a combination of different parameters associated with the subjects, the objects, the workflow, the correlated multi-modal sensor data, and/or the data associated with the monitored enclosure.

The evaluation engine 218a may perform risk assessment to determine whether the event should be considered significant or not. In accordance with an embodiment, the evaluation engine 218a may be configured to determine a risk score for the identified event. Accordingly, the event may be classified as significant if corresponding risk score exceeds a defined threshold value. In accordance with another embodiment, the event may be classified as a low-risk if corresponding risk score is between a first set of defined threshold values, a medium-risk if corresponding risk score is between a second set of defined threshold values, or a high-risk event if corresponding risk score is between a third set of defined threshold values. In accordance with yet another embodiment, the events may be classified as warranting attention or acknowledgment verses events warranting an immediate response based on the magnitude of the risk score, such as low-risk score and high-risk score, respectively. It should be noted that other classification schemes including additional categories of risk can be realized, without deviation from the scope of the disclosure.

The AI engine 218 may further include a recommendation engine 218b configured to recommend a corrective action to be taken corresponding to a non-compliant activity or a non-designated task performed by the subject 232 based on the pre-defined sequence of activities and the set of parameters retrieved from the data store 226. The recommendation engine 218b may be configured to determine or infer and provide one or more responses as the recommendation to the identified events. In accordance with various examples, the recommendation to the identified event may include, but are not limited to, notifying the subject 232 regarding the event, tracking an attribute associated with the event via a GUI, determining a new attribute for tracking that is related to the event and automatically beginning tracking of the new attribute via the GUI, requiring the subject 232 to respond to and/or acknowledge the notification, determining a recommended action in response to the event for the one or more subjects, determining and recommending a specific subject that is most adapt or appropriate to perform the recommended response, notifying the personnel managing the one or more subjects about the event, and the like.

The access control system 220 may comprise suitable logic, circuitry, and interfaces that may be configured to recognize, authenticate, and authorize the subject 232 to perform a set of designated tasks in the monitored enclosure. In case any violation is observed with respect to the recognition, authentication, and authorization of the subject 232, the access control system 220 may be further configured to generate a notification or alarm ensuring that the sterile fields within the monitored enclosure remain safeguarded. The access control system 220 may be enforced through several types of controls, for example, responsibility-based access control, rule-based access control (RAC), role-based access control (RBAC), discretionary access control (DAC), attribute-based access control (ABAC), identity-based access control (IBAC), and/or the like.

The authorization system 222a may comprise suitable logic, circuitry, and interfaces that may be configured to authorize the subject 232 to selectively perform a set of designated tasks. The authorization may be based on the correlated multi-modal sensor data and one of a compliance of set of activities performed by the subject 232 with a pre-defined sequence of activities and a set of parameters retrieved from the data store 226. The set of parameters may comprise pre-defined rules associated with each of the set of designated tasks retrieved from the data store 226, a list of responsibility exclusions defined for the subject 232, a set of protocols pertaining to responsibilities and duties defined for the subject 232 in a workflow, and identification data and credentials read from the portable device 230 associated with the subject 232. In accordance with an embodiment, the authorization system 222a may be configured to obtain information pertaining to the set of activities and the set of designated tasks performed by the subject 232 based on the correlated multi-modal sensor data.

The alert system 222b may comprise suitable logic, circuitry, and interfaces that may be configured to generate a notification for an unauthorized subject in response to performing, by the unauthorized subject, at least one of non-compliant activity or a non-designated task. In accordance with an embodiment, the alert system 222b may generate the notification in response to a breach of an outermost sterile field, inner sterile fields, and a critical sterile field around a sterile object based on the distance data between the sterile object and the unauthorized subject. In accordance with another embodiment, the notification may be generated as feedback, via a plurality of output devices in accordance with a predefined mode, based on at least one of the detection of the event associated with the unauthorized action performed by the unauthorized subject or the breach of the sterile fields around the sterile object based on the distance data between the sterile object and the unauthorized subject. The predefined mode may be one or more of visual, audible, audio-visual, or haptic feedback mode. In accordance with an embodiment, the plurality of output devices may comprise the portable device associated with the unauthorized subject, another portable device associated with another subject related to the unauthorized subject, and the user interface 228 associated with the external sterile manager 236.

The controller engine 224 may comprise suitable logic, circuitry, and interfaces that may be configured to execute control algorithms to correlate multi-modal sensor data associated with a subject 232 checking into or mo416ving around within the monitored enclosure. The controller engine 224 may receive the multi-modal sensor data at defined time intervals from a plurality of sensing devices located within the monitored enclosure. The plurality of sensing devices may include a first modality of sensing devices that correspond to the optical sensing devices 210 from the surveillance system 202. The plurality of sensing devices may include a second modality of sensing devices that correspond to the set of locator devices 208 from the indoor positioning system 204. The plurality of sensing devices may include a third modality of sensing devices that correspond to the distance sensors 214 installed at the outer boundary of the object 234.

In accordance with an embodiment, the multi-modal sensor data from the plurality of sensing devices may be correlated at the defined time intervals based on several factors, such as time, position, 3D modelling, and the like. In accordance with an embodiment, the controller engine 224, in conjunction with the ML engine 216, may derive correlations of the multi-modal sensor data received from the plurality of sensing devices at the defined time intervals by using machine learning. The processing module of the controller engine 224 may represent all or a portion of a programmable logic controller, ASIC, FPGA, or other suitable computer processor.

The data store 226 may comprise suitable logic, circuitry, and interfaces that may be configured to store data associated with workflow, subjects, objects, and the facility (i.e., the monitored enclosure) where sterile fields are required to be maintained. The data store 226 may further store standard operating procedure information corresponding to the given workflow, human resources data that identifies capabilities, performance, roles and responsibilities information for the subjects employed at the monitored enclosure, finance information that provides financial costs associated with different aspects of the given workflow, and inventory data that identifies available objects, such as supplies and equipment, within the monitored enclosure. The data store 226 may further store historical instances pertaining to the data, as described above, which may be utilized by the ML engine 216 as training samples.

The user interface 228 may be operable to receive inputs from a user of the SFC system 102 and further operable to generate outputs for presentation to the external sterile manager 236 (for example, via a display interface to a display device). The user interface 228 may include one or more input devices, for example, a keyboard, a number pad, a mouse, a touch-sensitive display, a navigation key, a function key, a microphone, a voice recognition component, or any other mechanism capable of receiving an input from the external sterile manager 236, or any combination thereof. Further, the user interface 228 may include one or more output devices, for example, a display interface, a speaker, a haptic feedback mechanism, a printer, any other mechanism capable of presenting an output to the external sterile manager 236, or any combination thereof.

The portable device 230 may be an electronic device which may be carried by the subject 232 within the monitored enclosure. In accordance with an embodiment, the portable device 230 may be one of a smartphone or a smartwatch associated with the subject 232. In accordance with another embodiment, the portable device 230 may be a key fob, a lanyard card, or a wearable device (such as a wristband). In certain examples, different instances of the portable device 230 may be worn by the subject 232 differently, such as on a wrist or arm, around an ankle or the neck, or attached to the belt. In yet other examples, the portable device 230 may be embedded in a smart clothing or smart glasses worn by the subject 232. The portable device 230 may be connected with the one or more communication networks, such as the local area network 108a and/or the wide area network 108b, to receive messages and data, such as recommendation and/or alerts, from other systems and devices in the computing environment 100.

The portable device 230 may be attachable to a tag from the set of tags 206 based on which the position (or location) of the subject 232 may be determined. In such a case, optionally, the tag may be configured to harvest energy from the portable device 230 associated with the subject 232. The portable device 230 may be further configured to render notifications generated by the alert system 222b in a predefined mode. In accordance with an embodiment, the recommended corrective action generated by the AI engine 218 may also be rendered as feedback on the portable device 230 in the predefined mode. The predefined mode may be one or more of a visual, audible, audio-visual, or haptic feedback mode.

In accordance with an embodiment, the notification generated by the alert system 222b may be rendered at the portable device 230, as feedback, at a basic alert level in response to breach of the outermost sterile field around the sterile object. In accordance with an embodiment, the notification generated by the alert system 222b may be rendered at the portable device 230 and additional portable devices at advanced alert levels in response to breach of the inner sterile fields and the critical sterile field around the sterile object. In such embodiment, the additional portable devices may be associated with other subjects related to the unauthorized subject.

The subject 232 may be personnel within the monitored enclosure whose visuals and location (or position) is continually tracked by the SFC system 102. The subject 232 may be carrying the portable device 230 configured to receive and render the recommendations and/or notifications generated by the recommendation engine 218b and/or the alert system 222b respectively, in the predefined mode. Such recommendations and/or alerts may be generated based on an occurrence of event identified within the monitored enclosure. For example, when the monitored enclosure corresponds to an operating room in a healthcare facility, the subject 232 may be sterile personnel or non-sterile personnel. Examples of the sterile personnel may include, but are not limited to, be a surgeon, a surgical assistant, or a scrub nurse. Examples of the non-sterile personnel may include, but are not limited to, a circulating nurse or a non-clinician (for example, a visitor). In another example, when the monitored enclosure corresponds to a food preparation and packaging site, the subject 232 may be sterile or non-sterile workers. Non-sterile workers may be involved in loading and unloading of raw materials. Sterile workers may be the ones involved in primary, secondary or tertiary food processing processes.

The object 234 may correspond to an item, article, or a site that is required to be maintained sterile in the monitored enclosure so that any risk of site-acquired infections can be mitigated. The view of the object 234 may be captured by the optical sensing devices 210 so that any inadvertent event may be tracked. To maintain the sterility, the outer boundary of the object 234 may be equipped with distance sensors 214 to monitor proximate subjects, such as the subject 232 in the vicinity. Various examples of the object 234 may include, but are not limited to, a patient's bed and a surgical tray.

The external sterile manager 236 may correspond to a sterile field manager or a coordinator positioned outside the monitored enclosure. The role of the external sterile manager 236 may be associated with various responsibilities. Examples of such responsibilities may include, but are not limited to, overlooking multiple monitored enclosures, supplying data used in the identification systems, supplying parameters and/or data required by the ML engine 216 for generation of notifications, monitoring high level alerts for real-time action or post-process evaluation. It should be noted that the scope of the responsibilities of the external sterile manager 236 may vary in accordance with an enterprise-wide system, without any deviation from the scope of the disclosure.

It should be noted that all or parts of hardware components of the various sub-systems of the SFC system 102 disclosed herein may readily be provided in a system-on-a-chip (SoC), including a central processing unit (CPU) package. In accordance with an embodiment, the SoC may correspond to an integrated circuit (IC) that integrates components of a computer or other electronic system into a single chip. The SoC may contain digital, analog, mixed-signal, and radio frequency functions, all of which may be provided on a single chip substrate. Other embodiments may include a multi-chip-module (MCM), with multiple chips located within a single electronic package and configured to interact closely with each other through the electronic package. In accordance with another embodiment, the computing functionalities of the SFC system 102 disclosed herein may be implemented in one or more silicon cores in a reduced instruction set computing (RISC) processor, an ASIC processor, a complex instruction set computing (CISC) processor, FPGAs, and other semiconductor chips, processors, or control circuits.

It should be noted that the terms "processor" or "microprocessor" include not only a traditional microprocessor (such as Intel's® industry-leading x86 and x64 architectures), but also graphics processors, matrix processors, and any ASIC, FPGA, microcontroller, digital signal processor (DSP), programmable logic device, programmable logic array (PLA), microcode, instruction set, emulated or virtual machine processor, or any similar device, combination of devices, or logic elements (hardware or software) that permit the execution of instructions.

In operation, the indoor positioning system 204 may be configured to determine location data of the subject 232 within the monitored enclosure. In accordance with an embodiment, the indoor positioning system 204 may correspond to at least one of an electromagnetic radiation-based system, sound-based system, radio frequency-based system, or non-radio frequency-based system. The optical sensing devices 210 may be configured to capture optical sensor data associated with the subject 232 within the monitored enclosure. The optical sensor data may be transformed into a vector space to identify gestures performed by the subject 232 within the monitored enclosure. Further, the distance sensors 214 may be configured to determine the distance data of the subject 232 with respect to a sterile object, such as the patient's bed. The distance sensors 214 may be installed at outer boundary of the sterile object, such as the patient's bed.

The multi-modal sensor data may be received at the controller engine 224 at defined time intervals from the plurality of sensing devices, such as the indoor positioning system 204, the optical sensing devices 210, and the distance sensors 214, located within the monitored enclosure. Accordingly, the controller engine 224, may be configured to correlate multi-modal sensor data associated with an exemplary subject, such as the subject 232, performing a plurality of actions within the monitored enclosure. The plurality of actions may comprise a set of activities and a set of designated tasks. The set of activities may correspond to standard sterile procedural steps required to be performed by the exemplary subject, who is sterile personnel, for example, the surgeon and the scrub nurse, to become a part of the sterile environment in the monitored enclosure. The set of designated tasks may correspond to the tasks required to be performed by the exemplary subject, either sterile or non-sterile personnel, such as a circulating nurse, in the monitored enclosure based on the corresponding set of roles, responsibilities, and duties defined in the data store 226. The correlated multi-modal sensor data may correspond to location data of the subject 232, gestures performed by identified subject 232, and the distance data that pertains to distance of the subject 232 with respect to a sterile object within the monitored enclosure.

In accordance with an embodiment, the ML engine 216 may be configured to train a classification model based on training datasets pertaining to the movement pattern or the plurality of actions derived from the correlated multi-modal sensor data. The ML engine 216, may be configured to generate a prediction about likelihood of an input action being classified with an output classification label based on the trained classification model.

The authorization system 222a may be configured to authorize the exemplary subject, such as the subject 232, to selectively perform a set of designated tasks based on contextual analysis of the correlated multi-modal sensor data, the set of parameters retrieved from the data store 226, and/or a set of activities performed by the subject 232. In accordance with an embodiment, the unauthorized subject may perform at least one of non-compliant activity and/or a non-designated task.

In accordance with an embodiment, the recommendation engine 218b, may be configured to recommend a corrective action to be taken corresponding to a non-compliant activity or a non-designated task performed by the subject 232 based on a pre-defined sequence of activities and the set of parameters.

In accordance with an embodiment, the alert system 222b, may be configured to generate a notification, via the portable device 230, based on detection of an event associated with an unauthorized action performed by an unauthorized subject. The unauthorized action performed by the unauthorized subject may correspond to at least one of a non-compliant activity and/or a non-designated task. The notification may be generated further in response to a breach of an outermost sterile field around a sterile object, such as the patient's bed, based on the distance data between the sterile object, such as the patient's bed, and the subject, such as the subject 232. The generated notification may be rendered at the portable device 230 at a basic alert level in accordance with a predefined mode.

In accordance with an embodiment, the generated notification may be rendered at the portable device 230 and additional portable devices at advanced alert levels in response to breach of inner sterile fields and a critical sterile field around the sterile object, such as the patient's bed. In accordance with an embodiment, the outermost sterile field, the inner sterile fields, and the critical sterile field, may be adjustable and defined dynamically.

In accordance with various embodiment, the outermost sterile field and the inner sterile fields may have a uniform, or a non-uniform boundary based on a plurality of characteristics of a third modality of sensing devices, such as the distance sensors 214.

Figure 3:
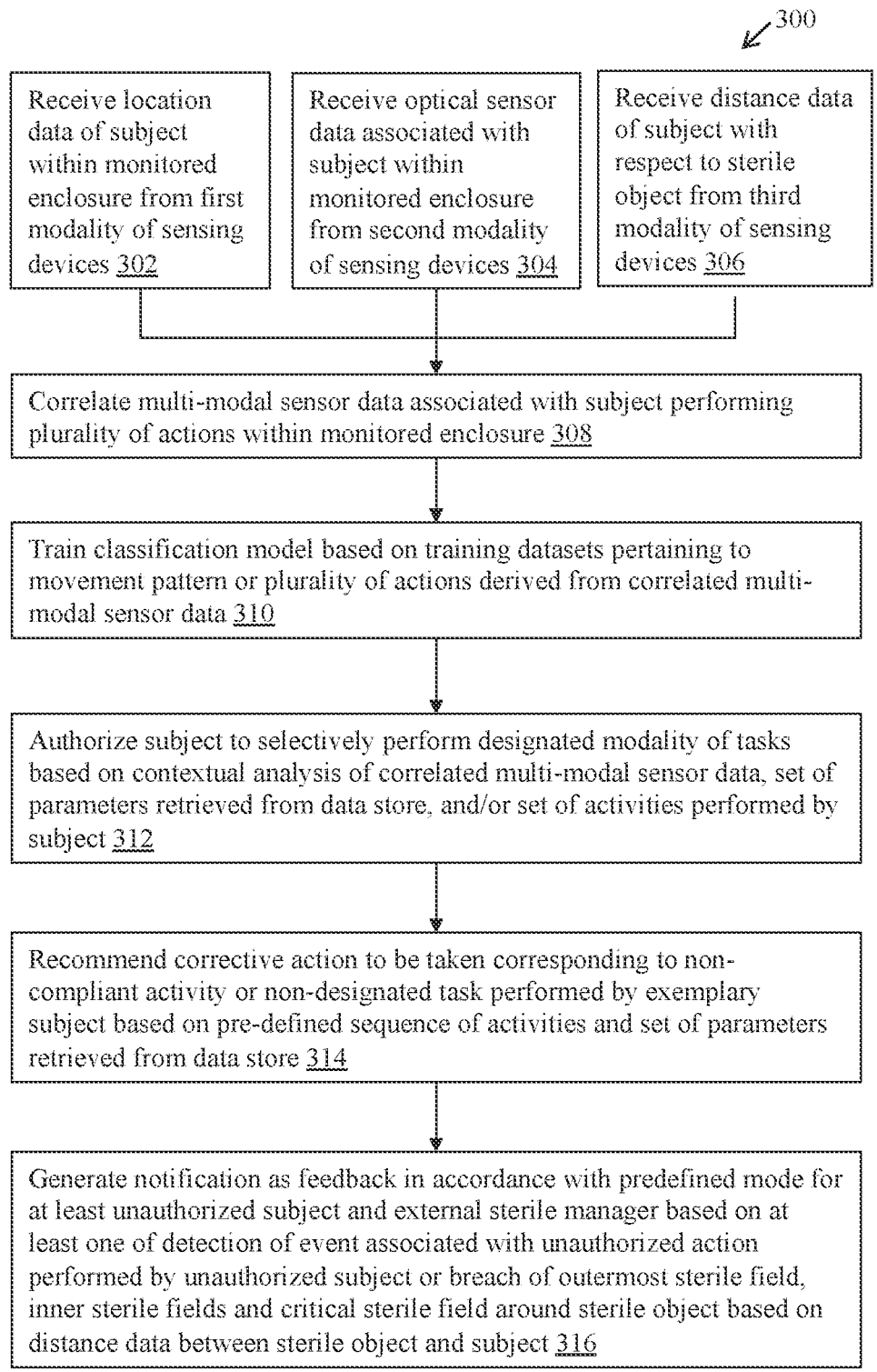
FIG. 3 depicts a flowchart illustrating exemplary operations for maintaining sterile fields in a monitored enclosure, in accordance with various embodiments of the disclosure.
Figure 4A:
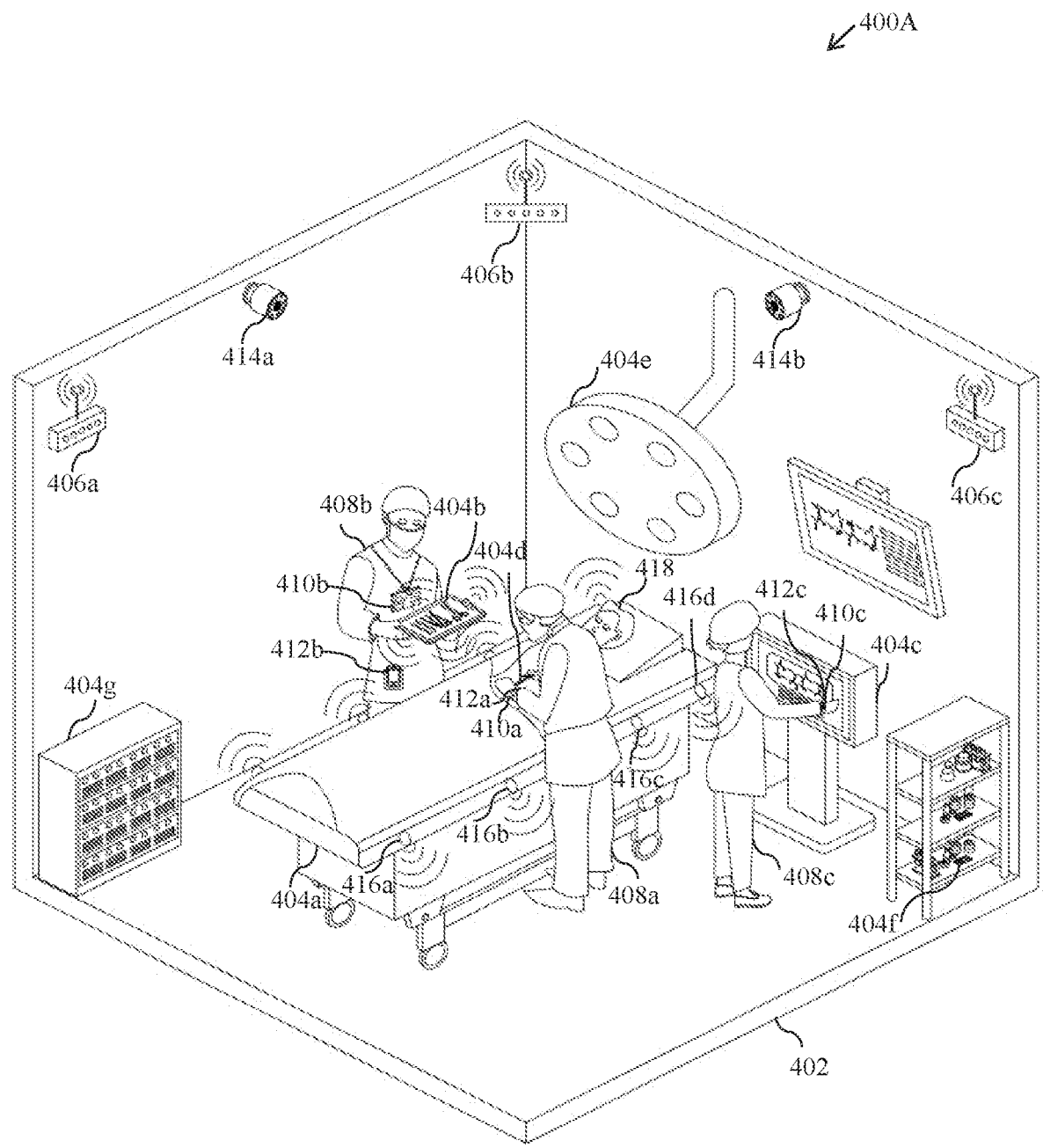
FIG. 4A depicts a perspective view of a monitored enclosure, such as an operating room at a healthcare facility, in accordance with an embodiment of the disclosure.
Figure 4B:
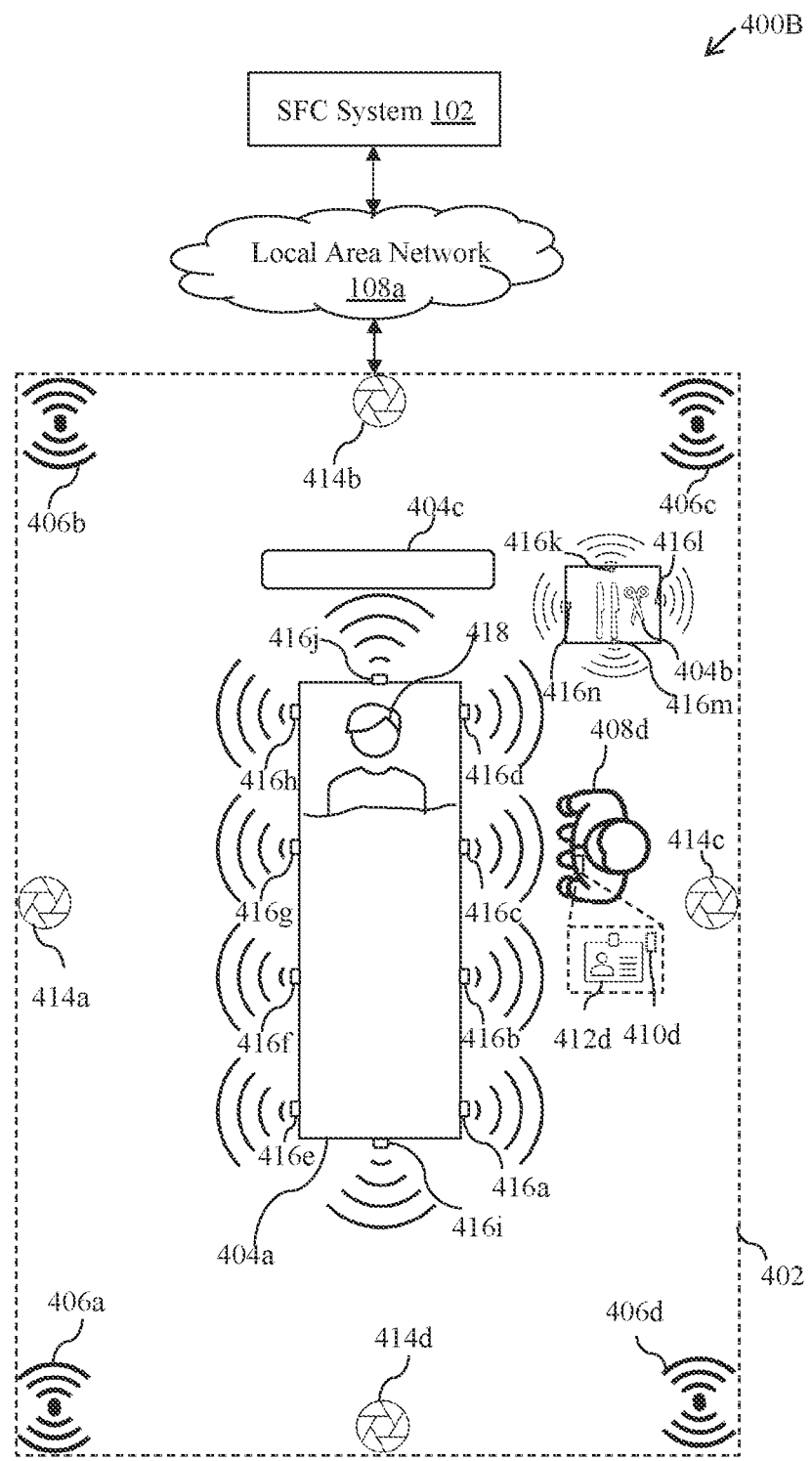
FIGS. 4B and 4C depict top views of a monitored enclosure, such as an operating room at a healthcare facility, in accordance with an embodiment of the disclosure.
Figure 4C:
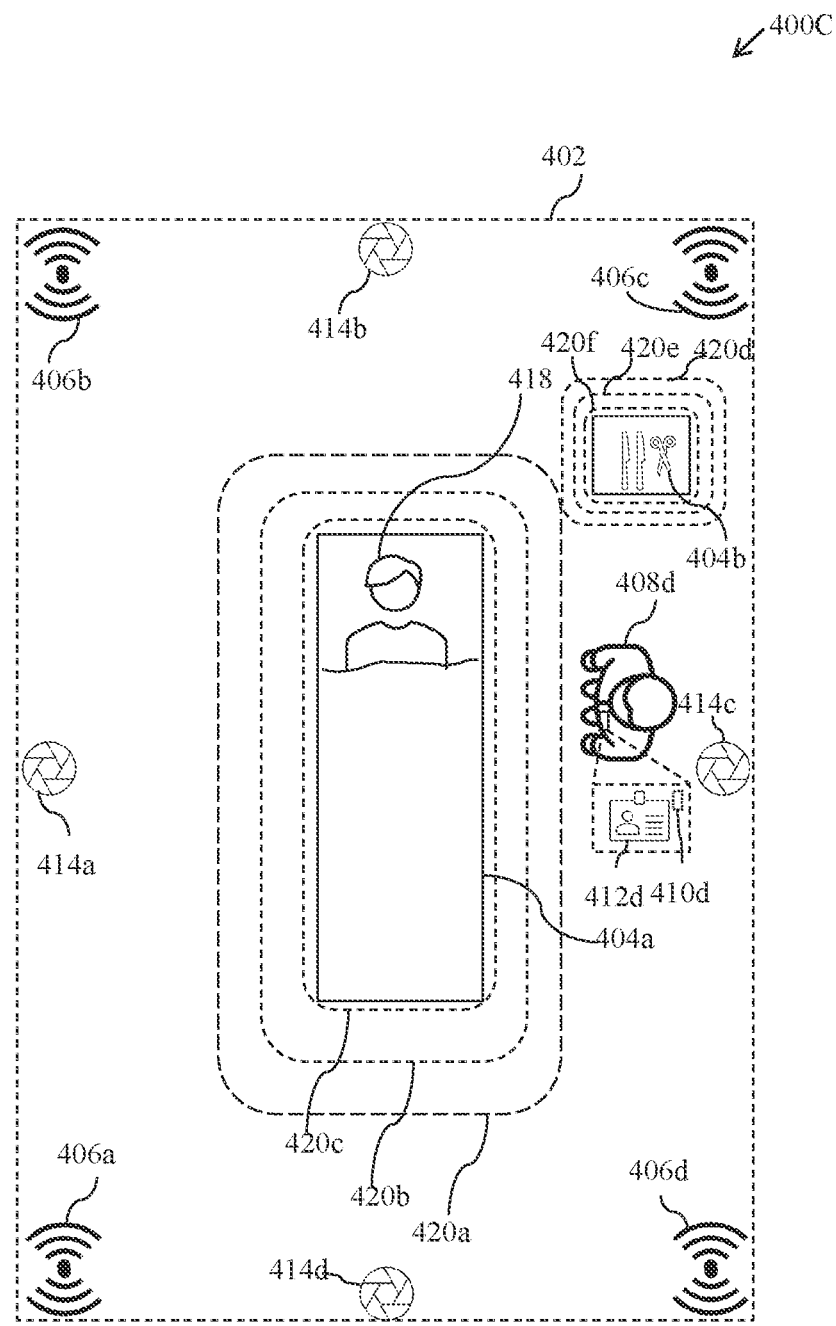

FIG. 3 depicts a flowchart 300 illustrating exemplary operations for maintaining sterile fields in a monitored enclosure, in accordance with various embodiments of the disclosure. FIG. 3 is described in conjunction with FIGS. 1, 2, and 4A to 4C. FIG. 4A depicts a perspective view 400A of the monitored enclosure, such as an operating room 402 at a healthcare facility, in accordance with an embodiment of the disclosure. FIGS. 4B and 4C depict top views 400B and 400C of the monitored enclosure, such as the operating room 402 at the healthcare facility, in accordance with an embodiment of the disclosure.

With reference to FIGS. 4A to 4C, within the operating room 402, there are shown a plurality of objects 404a, ..., 404g that includes a plurality of sterile objects 404a, ..., 404d having corresponding sterile fields, i.e., pre-defined safe zones or virtual fences. The sterile fields of the plurality of sterile objects 404a, ..., 404d are required to be continually maintained by following a set of sterile practices and pre-empting breaches of the sterile fields to prevent any possible transmission of infection. The set of sterile practices performed before, during and after scheduled procedures reduces the number of potentially infectious microbes and helps to reduce the risk of post procedure on-site-acquired infections. Examples of the sterile practices may include, but are not limited to, patient risk assessment, environmental cleaning, disinfection and sterilization of instrumentation, patient antibiotic prophylaxis, and the use of standard precautions. Examples of the plurality of sterile objects 404a, ..., 404d may include, but are not limited to, an operating room (OR) bed 404a of the patient 418, a surgical tray and surgical tools 404b, instruments and equipment 404c, and an incision site 404d. The plurality of objects 404a, 404g further includes a plurality of non-sterile objects 404e, ..., 404g, for example, a surgical lamp 404e, medication labels 404f, and electronic switches 404g.

Once the set of sterile practices is performed in the operating room 402, each of the plurality of sterile objects 404a, ..., 404d is to be safe guarded from all possible sources of contamination. The main source of contamination may be a non-sterile contact of one or more external bodies (for example, the subject 232) entering the operating room 402, such as the plurality of clinicians 408a, ..., 408c, and non-clinician 408d, with any of the plurality of sterile objects 404a, ..., 404d. Some of the plurality of clinicians 408a, ..., 408c, such as a surgeon 408a and a scrub nurse 408b, are mandatorily required to be sterile personnel as they would be having a direct contact with the plurality of sterile objects 404a, ..., 404d during upcoming time durations. For example, the surgeon 408a would be using the surgical tools 404b to create the incision site 404d and performing surgery on the patient 418. In another example, the scrub nurse 408b serves to prepare the operating room 402 and work closely with the surgeon 408a, for example, handling instruments, assisting with procedures, and monitoring the patient 418 throughout the surgery. However, other clinician, such as a circulating nurse 408c, and a non-clinician 408d may not be required to be sterile personnel as they are not permitted to have any direct contact with the plurality of sterile objects 404a, ..., 404d during upcoming time durations. As shown in FIG. 4C, in accordance with an embodiment, the non-clinician 408d may be only associated with the patient 418 and not to the healthcare facility. Thus, the non-clinician 408d may be required to perform the set of activities to maintain the sterility of the operating room 402 but does not qualify for the set of designated tasks as the non-clinician 408d is not on the payroll of the healthcare facility. The identification data of the non-clinician 408d, such as temporary wearable ID card with an embedded tag, name, address, phone number, and date/time of visit, may be recorded and stored in the data store 226 as the non-clinician 408d enters the healthcare facility.

Besides, there are further shown a plurality of UWB anchors 406a, ..., 406d and a plurality of tags 410a, ..., 410c (corresponding to the indoor positioning system 204), a plurality of portable electronic devices 412a, ..., 412c, a plurality of cameras 414a, ..., 414d (corresponding to the optical sensing devices 210), a plurality of radar sensors 416a, ..., 416n (corresponding to the distance sensors 214), and a patient 418 (upon which the surgery is performed).

As disclosed herein, the subject 232 (such as the plurality of clinicians 408a, ..., 408c, a non-clinician 408d) may check-in and move around within the monitored enclosure, such as the operating room 402 for a defined time duration. Each subject stays within the monitored enclosure, i.e., the operating room 402, for the defined time duration and performs a plurality of actions. The plurality of actions may comprise a set of activities and a set of designated tasks, as described hereinafter.

As a primary step to maintain the sterility of each of the sterile fields in the operating room 402, the SFC system 102 must ensure that all the sterile personnel, such as the surgeon 408a and the scrub nurse 408b, in the operating room 402 have duly performed each of the set of activities stepwise without fail. An exemplary set of activities, as recorded as a part of the standard operating procedure (SOP) in the data store 226 for sterile personnel, i.e., both the surgeon 408a and the scrub nurse 408b in the operating room 402, is described below:

1. Preparation and Masking
   1.1. Remove watch and rings from the hands.
   1.2. Ensure that the sleeves are at least two to three inches above the elbows.
   1.3. Open the gown pack onto a clean table by grabbing the outermost edges to maximize the sterile field
   1.4. Open the glove packet and drop onto a clean area
   1.5. Collect a nail pick and brush
   1.6. Put on a face mask, securing appropriately
2. Scrubbing
   2.1. Allow the water to run, cover the nail pick and brush with soap
   2.2. Use an elbow on the soap dispenser to dispense the soap on the other hand
   2.3. Clean the nails and remove any debris from the hands 2.4. Scrub the hands and forearms, down to the elbows, using the standard hand washing procedure for the hands and a rotational action for the forearms for at least one minute 2.5. Wash the soap from the hands and forearms by holding up the arms with the hands elevated under the tap, such that the water runs off into the sink from the elbows 2.6. Repeat this procedure three times, initially down to the mid-forearm, then down to the wrists, then just for the hands, each time lasting for at least one minute 2.7. Dry the hands forearms with the sterile towels in the gowning pack using a dabbing motion keeping the arms elevated. Use one towel for each hand and then disposing them off.

3. Gowning and Gloving 3.1. Take the sterile gown and gently shake it out, ensuring not to let anything else touch it 3.2. Open it, place the hands into the sleeves, and keep the hands inside the sleeves 3.3. Seek help from an assistant, such as the scrub nurse 408b, to help pull it up over the shoulders and fasten it up at the back 3.4. Take the right-hand glove and place it, palm down, fingers facing the body 3.5. Grasp the bottom of the cuff with the thumb and index finger of the right hand, still inside the sleeve, grasp the top of the cuff with the left hand (also inside the sleeve) and pull the glove around and over the right hand 3.6. Gently pull on the sleeve of the gown to help move the hands into the gloves and straighten out the fingers, the sleeves of the gown should remain over most of your palm 3.7. Repeat the technique for the left hand Once the above set of activities is performed, the sterile personnel, i.e., the surgeon 408a and the scrub nurse 408b, must ensure to rest their hands in the front as they move around and not to touch any non-sterile object to ensure that sterility is maintained. It should be noted that the set of activities is mandatory and religiously performed as a standard sterile procedure by the sterile personnel, i.e., the surgeon 408a and the scrub nurse 408b, to become a part of the sterile environment in the operating room 402. Once the set of activities is performed, the next action that is to be performed is set of designated tasks.

In accordance with an embodiment, the set of designated tasks may be recorded as next part of the standard operating procedure (SOP) in the data store 226 for each of the plurality of clinicians 408a, . . . , 408c in the operating room 402. It should be noted that the set of designated tasks is assigned to each subject, who is on the payroll of the healthcare facility, which the operating room 402 is a part of. The set of designated tasks may be performed by the exemplary subject based on mapping of the Designation ID with the ID of the exemplary subject. Each of the set of designated tasks may include a set of jobs, responsibilities, and/or duties required to be performed by the mapped exemplary subject. An exemplary set of designated tasks is described below that is stored in the data store 226:

1. Designation ID: H001
Sterility Status: Mandatory
   1.1. Perform surgical procedures to prevent or correct injury, disease, deformities, and patient function while adhering to regulatory and ethical protocols
   1.2. Follow established surgical techniques during surgery
   1.3. Ensure sterility in the operating room, and all equipment and instruments
   1.4. Ensure that the patient is tolerating the procedure
   1.5. Ensure that the surgical team is working at peak performance
   1.6. Maintain composure and be ready to manage any crisis that may arise 2. Designation ID: H002
Sterility Status: Mandatory
   2.1. Inspect the operating room prior to surgery, ensuring that the operating room 402 is clean, sterile, and ready for the patient
   2.2. Review patient charts and confirm data
   2.3. Ensure all surgical tools, sponges, needles, and other instruments required for a surgery before and after the operation
   2.4. Help the rest of the surgical team in the operating room to wash their hands and put on the sterile gowns, gloves, and masks they wear to protect themselves and the patient
   2.5. Follow the directions of the surgeon
   2.6. Pass the surgical tools and other instruments to the surgeon and must often anticipate when the surgeon is ready for the next tool and what the surgeon needs 2.7. Monitor the patient's condition during surgery
   2.8. Remove the surgical tools and help prepare the patient for transport to the recovery room 3. Designation ID: H003
Sterility Status: Not Mandatory
   3.1. Review assessments of a patient prior to the operation
   3.2. Oversee the procedure and ensures it follows hospital policy and safety guidelines
   3.3. Inspect surgical equipment to determine everything is in working order
   3.4. Confirm the patient's identity and verify that necessary consent forms are completed and in order
   3.5. Obtain medical equipment that is in sterile packaging
   3.6. Open the sterile packaging
   3.7. Retrieve any additional supplies or tools the team needs
   3.8. Determine how the patient will be cared for For example, the employee IDs of the surgeon 408a, the scrub nurse 408b, and the circulating nurse 408c may be mapped with Designation IDs: H001, H002, and H003, respectively. The non-clinician 408d is not mapped with any Designation ID, as the non-clinician 408d is merely a visitor and not on the payroll of the healthcare facility. It should be noted that for the sterile personnel, i.e., the surgeon 408a and the scrub nurse 408b, the set of activities is followed by the set of designated tasks. Further, for the non-sterile personnel, i.e., the circulating nurse 408c, only the set of designated tasks is required to be performed.

Referring to the flowchart 300 in FIG. 3, at 302, location data of an exemplary subject within the monitored enclosure may be received from the first modality of sensing devices. In accordance with an embodiment, the controller engine 224 in the SFC system 102 may be configured to receive the location data of the exemplary subject within the monitored enclosure from the first modality of sensing devices. In accordance with an embodiment, the first modality of sensing devices may correspond to the indoor positioning system 204.

For example, as shown in FIGS. 4A to 4C, the indoor positioning system 204 may be implemented via the UWB technology in the operating room 402. The location data may be determined by the first modality of sensing devices that correspond to the indoor positioning system 204. The first modality of sensing devices may include a combination of the plurality of tags 410a, . . . , 410c and the plurality of UWB anchors 406a, . . . , 406d.

Each of the plurality of clinicians 408a, . . . , 408c may be associated with a corresponding portable device which may be embedded, connected, or attached with a corresponding tag from the plurality of tags 410a, . . . , 410c. For example, the surgeon 408a may be associated with a first portable electronic device 412a, such as a smart band, which may be attached with the first tag 410a. The scrub nurse 408b may be associated with a second portable electronic device 412b, such as a smartphone, which may be connected with the second tag 410b embedded in a passive ID card worn around the neck. The circulating nurse 408c may be associated with a third portable electronic device 412c, such as a smartwatch, to which the third tag 410c is attached. In accordance with an exemplary embodiment, for maintaining the sterile fields in the monitored enclosure, i.e., the operating room 402, the sterile personnel, such as the surgeon 408a and the scrub nurse 408b, may be required to wear the corresponding portable electronic devices with the attached tags underneath the sterile gowns. For example, as depicted in FIG. 4A in dotted lines, the first portable electronic device 412a attached with the first tag 410a may be worn by the surgeon 408a underneath the sterile gown. Also, the second portable electronic device 412b and the second tag 410b embedded in the passive ID card may be worn by the scrub nurse 408b underneath the sterile gown to maintain the sterile fields in the operating room 402.

In accordance with various embodiments, the plurality of portable electronic devices 412a associated with the different exemplary subjects, i.e., the surgeon 408a, the scrub nurse 408b, and the circulating nurse 408c, respectively, may be connected to the SFC system 102, via one or more communication networks, such as the local area network 108a and/or the wide area network 108b.

In accordance with an exemplary embodiment, each of the plurality of tags 410a, . . . , 410c, may include a transceiver module capable of receiving various RF signals from the plurality of UWB anchors 406a, . . . , 406d and transmitting location data to the plurality of UWB anchors 406a, . . . , 406d, via the UWB communication protocol 104i. In such embodiments, the plurality of tags 410a, . . . , 410c, may be configured to measure TDoA of the RF signals from the plurality of UWB anchors 406a, . . . , 406d and use the TDoA to triangulate the three-dimensional coordinates of the plurality of tags 410a, . . . , 410c.

In accordance with another exemplary embodiment, the plurality of tags 410a, . . . , 410c may function as a reflector of RF pulses from the plurality of UWB anchors 406a, . . . , 406d. The plurality of tags 410a, . . . , 410c may be configured to modulate the reflected RF signal such that the plurality of UWB anchors 406a, . . . , 406d may be configured to interpret the modulated signal as a unique identifier of the plurality of tags 410a, . . . , 410c.

In accordance with another exemplary embodiment, the plurality of UWB anchors 406a, . . . , 406d may be configured to synchronize corresponding internal clocks via wired LAN (such as Ethernet cable-based network) or a wireless network (such as Wi-Fi-based network). Then the plurality of UWB anchors 406a, . . . , 406d listens for pings from the plurality of tags 410a, . . . , 410c. Once synchronized, the plurality of UWB anchors 406a, . . . , 406d records the time when the signal was received and transmit to the controller engine 224. The controller engine 224 may serve as a real time location server (RTLS) which calculates the location of the plurality of tags 410a, . . . , 410c based on TDoA at the plurality of UWB anchors 406a, . . . , 406d.

Each UWB anchor from the plurality of UWB anchors 406a, . . . , 406d may function as a locator device, as described in FIG. 2. The plurality of UWB anchors 406a, . . . , 406d may be installed at strategic locations in various parts of the operating room 402. One exemplary strategic location may be a position that is 2.5 m-5 m meters above floor level and at least 15 cm from the top wall or the ceiling. The plurality of UWB anchors 406a, . . . , 406d may be powered via a universal serial bus (USB) or power over ethernet (PoE). For example, 10000 mAh USB battery may power each UWB anchor from the plurality of UWB anchors 406a, . . . , 406d for approximately 50-60 hours. In one case, as shown in FIGS. 4A to 4C, the plurality of UWB anchors 406a, . . . , 406d is installed at calculated heights in separate corners of the operating room 402. However, in other case, the plurality of UWB anchors 406a, . . . , 406d may be installed at other strategic locations, such as on separate walls, within the operating room 402, without any deviation from the scope of the disclosure.

In accordance with an embodiment, the plurality of UWB anchors 406a, . . . , 406d may generate location data and transmit the location data to the controller engine 224 via a plurality of data links. The plurality of UWB anchors 406a, . . . , 406d may transmit the received plurality of data links data representative of the RF signal to the controller engine 224.

In accordance with an embodiment, the controller engine 224 may process the data received from the plurality of UWB anchors 406a, . . . , 406d to determine the angular position of each of the plurality of clinicians 408a, . . . , 408c with respect to each of the plurality of UWB anchors 406a, . . . , 406d. The angular position may be measured in terms of, for example, an azimuth angle and an elevation angle. Based on the location of the plurality of UWB anchors 406a, . . . , 406d, the controller engine 224 may be configured to triangulate the angular positions and compute the three-dimensional position, i.e., the location data, of each of the plurality of clinicians 408a, . . . , 408c. In accordance with an embodiment, to compute the displacement (for example, the three-dimensional position) of each of the plurality of clinicians 408a, . . . , 408c using the angular position information, only two angular position measurements may be required (such as two pairs of azimuth and elevation angles), and therefore only two UWB anchors may be required. However, improvements in the accuracy and range of the system may be achieved if two or more synchronized UWB anchors are used.

In accordance with an embodiment, the location data may comprise {x, y, and z} detected coordinates, an identity, and a timestamp of detected coordinates of the plurality of tags 410a, . . . , 410c. It should be understood that the coordinates provided by the plurality of UWB anchors 406a, . . . , 406d may not necessarily be absolute locations. In accordance with another embodiment, the coordinates provided by the plurality of UWB anchors 406a, . . . , 406d may be relative values from a specific starting location, and/or values relative to each other. For example, a first UWB anchor 406a may arbitrarily be set to have coordinates of {0, 0, 0} and a second UWB anchor 406b and devices may be determined relative to the location of the first UWB anchor 406a.

In accordance with an embodiment, the plurality of tags 410a, . . . , 410c, and/or the plurality of UWB anchors 406a, . . . , 406d may operate in a discontinuous reception mode (DRX) in which signals from the plurality of UWB anchors 406a, . . . , 406d may be discontinued at appropriate times and/or intervals. For example, a DRX mode may be triggered upon a determination that the coordinates of the plurality of tags 410a, ..., 410c are not substantially changing (i.e., generally stationary). The DRX mode may then cause the plurality of UWB anchors 406a, ..., 406d and/or the plurality of tags 410a, ..., 410c, to transmit/emit RF signals on a longer cycle than when the plurality of tags 410a, ..., 410c is actively moving. The DRX mode may be disabled upon a detection that the coordinates of the plurality of tags 410a, ..., 410c, have changed.

It should also be noted that while UWB has been described with respect to the plurality of UWB anchors 406a, ..., 406d, any appropriate indoor positioning technology, such as Wi-Fi, RFID, ultrasound, or GPS, may be utilized to the extent that it can provide sufficient location resolution of the plurality of tags 410a, ..., 410c, associated with corresponding clinicians from the plurality of clinicians 408a, ..., 408c.

At 304, optical sensor data associated with the exemplary subject within the monitored enclosure, i.e., the operating room 402, may be received from the second modality of sensing devices. In accordance with an embodiment, the controller engine 224 may be configured to receive optical sensor data associated with the exemplary subject within the monitored enclosure, i.e., the operating room 402, from the second modality of sensing devices. In accordance with an embodiment, the second modality of sensing devices may correspond to the optical sensing devices 210, such as the plurality of cameras 414a, ..., 414d.

In accordance with an embodiment, the optical sensing devices 210, such as the plurality of cameras 414a, ..., 414d, may have a field-of-view (FOV) that includes the plurality of clinicians 408a, ..., 408c (performing the set of activities and the set of designated tasks), and the non-clinician 408d, and the plurality of objects 404a, ..., 404g located within the monitored enclosure, i.e., the operating room 402. The optical sensing devices 210 may be configured to capture images and/or video and identify the plurality of clinicians 408a, ..., 408c and the non-clinician 408d in the operating room 402 based on facial recognition algorithms, known in the art. The optical sensing devices 210 may be further configured to capture images and/or video of the sterile objects in the operating room 402, for example, the OR bed 404a of the patient 418, the surgical tray with the surgical tools 404b, the instruments and equipment 404c, and the incision site 404d. The optical sensing devices 210 may be further configured to capture images and/or video of the non-sterile objects in the operating room 402, for example, the surgical lamp 404e, the medication labels 404f, and the electronic switches 404g. The optical sensing devices 210 may be further configured to read dynamic signals presented on display devices (such as electrocardiogram which may one of the instruments and equipment 404c) and read the names and salt combinations from the medication labels 404f. The optical sensing devices 210 may be further configured to monitor status lights and physical settings of the electronic switches 404g (such as button position) of various clinical devices in the operating room 402.

In accordance with an embodiment, each of the plurality of cameras 414a, ..., 414d may be adjustable such that the direction, and hence the FOV of each of the plurality of cameras 414a, ..., 414d may be changed. For example, the plurality of cameras 414a, ..., 414d may be pan-tilt-zoom cameras, the movement of which may be automatically adjusted using a camera management software (not shown). The movement of the plurality of cameras 414a, ..., 414d may be adjusted to dynamically track the movement of the plurality of clinicians 408a, ..., 408c and/or the non-clinician 408d in the operating room 402. In accordance with an embodiment, the camera management software may be installed, hosted, and accessed entirely from one of the controller engine 224, the processing module 212, one of the plurality of cameras 414a, ..., 414d (referred to as a primary node), or one of the cloud resources 106.

In accordance with an embodiment, the outputs from each of the plurality of cameras 414a, ..., 414d may be provided to one of the controller engine 224, the processing module 212, the primary node, or one of the cloud resources 106 that employs a computer vision system. In accordance with various exemplary embodiments, computer vision system may be configured to acquire, process, analyze, understand the digital images and/or videos captured by the optical sensing devices 210, extract high-dimensional data from the real world, and produce numerical or symbolic information, for example in the forms of AI-based decisions. Sub-domains of the computer vision may include scene reconstruction, object detection, event detection, video tracking, object recognition, 3D pose estimation, learning, indexing, motion estimation, visual servoing, 3D scene modeling, and image restoration.

In accordance with an embodiment, the optical sensor data received from the optical sensing devices 210, i.e., the plurality of cameras 414a, ..., 414d, may be transformed into a vector space. The optical sensor data may be transformed into the vector space to identify gestures performed by the exemplary subject, such as one or more of the plurality of clinicians 408a, ..., 408c and the non-clinician 408d, located within the operating room 402. In accordance with an embodiment, one of the processing module 212 of the surveillance system 202 or the controller engine 224 may be configured to transform the optical sensor data received from the optical sensing devices 210, i.e., the plurality of cameras 414a, ..., 414d, into the vector space based on implementation of a computer vision system.

In an exemplary scenario, the computer vision system may transform the image representation into mathematical vector space, based on which detailed positional information, such as location of hands, of each of the plurality of clinicians 408a, ..., 408c and the non-clinician 408d in the operating room 402 may be determined. In an exemplary implementation, the optical sensing devices 210 may capture a sequence of images in the FOV that may include the hands of each of the plurality of clinicians 408a, ..., 408c and the non-clinician 408d. The hands may be identified based on shape recognition algorithms, using machine learning techniques and other suitable shape detection methods, and optionally checking specific parameters, such as color parameters. The positional information of the hands may be determined and a set of features of each hand may be tracked throughout the sequence of images. The tracking may correspond to determining or estimating the positions and other relevant information when the plurality of clinicians 408a, ..., 408c and the non-clinician 408d are observed to be moving in the sequence of images. Based on the tracking, the gesture performed by each of the plurality of clinicians 408a, ..., 408c and the non-clinician 408d may be determined in the operating room 402.

It should be appreciated that the hand gesture each of the plurality of clinicians 408a, ..., 408c and the non-clinician 408d may refer to a trajectory of movement of the hand tracked in different positions or postures, such as a hand with all fingers extended (open hand) or a hand with all fingers brought together such that their tips are touching or almost touching (as if the hand is holding a surgical tool) or other postures.

In accordance with an embodiment, the processing module 212 may be further configured to continuously track the movement of each of the plurality of clinicians 408a, . . . , 408c and the non-clinician 408d in the operating room 402 for a defined time duration. Each of the plurality of clinicians 408a, . . . , 408c and the non-clinician 408d may move around in the operating room 402 for the defined time duration to perform a set of activities. The set of activities is a standard sterile procedure for sterile clinicians, such as the surgeon 408a and the scrub nurse 408b, to become a part of the monitored enclosure, i.e., the operating room 402. The set of activities may not be mandatory for a non-sterile clinician, such as the circulating nurse 408c. The plurality of clinicians 408a, . . . , 408c and the non-clinician 408d in the operating room 402 may also move around to perform the set of designated tasks once the set of activities is determined to be compliant with the pre-defined sequence of activities.

The optical sensing devices 210, such as the plurality of cameras 414a, . . . , 414d, may be installed at strategic locations in various parts of the operating room 402 in such a manner that spatial differentiation and occluded scenes of interest, which may be caused by interruptions in the line-of-site, may be overcome. Therefore, the line-of-site may be continually established to perform robust tracking of patient, subjects, and objects within the operating room 402. As shown in FIGS. 4A to 4C, the plurality of cameras 414a, . . . , 414d may be installed at calculated heights at all the four walls of the operating room 402. However, in other case, the plurality of cameras 414a, . . . , 414d may be installed at other strategic locations, such as on separate walls, within the operating room 402, without any deviation from the scope of the disclosure. In accordance with an embodiment, the plurality of cameras 414a, . . . , 414d may be used to locate and/or identify subjects, objects, and motion to augment the indoor positioning system 204.

At 306, distance data of the exemplary subject with respect to a sterile object may be received from a third modality of sensing devices. In accordance with an embodiment, the controller engine 224 may be configured to receive the distance data of the exemplary subject with respect to the sterile object from the third modality of sensing devices. In accordance with an embodiment, the third modality of sensing devices may correspond to the distance sensors 214, such as the plurality of radar sensors 416a, . . . , 416n.

Each radar sensor from the plurality of radar sensors 416a, . . . , 416n may include a motion sensor, which may be an active reflected wave sensor (i.e., a radar sensor), configured to detect motion based on the Doppler effect. Each radar sensor may use millimeter wave (mmWave) sensing technology. In accordance with an embodiment, the radar may be a continuous-wave radar, such as frequency modulated continuous wave (FMCW) technology. The radar sensor may operate in microwave frequencies, for example, in some embodiments a carrier wave may be the range of 1-100 GHz (76-81 Ghz or 57-64 GHz in some embodiments), radio waves in the 300 MHz to 300 GHz range, millimeter waves in the 30 GHz to 300 GHz range, and bandwidth of at least 1 GHz. In accordance with an embodiment, the active reflected wave sensor may comprise antennas for both emitting waves and for receiving reflections of the emitted waves, and in some embodiment different antennas may be used for the emitting compared with the receiving.

In accordance with an exemplary embodiment, each of the plurality of radar sensors 416a, . . . , 416n may emit a radar signal and receive a reflected radar signal from the exemplary subject. A processor in the radar sensor may be configured to measure the reflected radar signal which corresponds to point clouds for each frame. Each point cloud may represent reflections from both static and moving reflection points of the exemplary subject that enters an outermost sterile field around the sterile object, i.e., the OR bed 404a. Each point in the point cloud may be defined by a 3-dimensional spatial position of the exemplary subject from which a reflection was received, and a peak reflection value, and a doppler value from the spatial position. The processor in the radar sensor may be configured to determine the distance data from the radar sensor to each point in the point cloud based on the measured radar signal reflected from the exemplary subject. It should be noted that the minimum distance data calculated from the nearest point in the point cloud, for example the point corresponding to the most proximate fingertip of the hand instead of the torso of the exemplary subject, may be considered to ascertain the proximity of the exemplary subject with respect to the radar sensor.

For example, as shown in FIGS. 4A and 4B, a first set of radar sensors 416a, . . . , 416j from the plurality of radar sensors 416a, . . . , 416n may be installed at the outer boundary of the sterile object, for example, the OR bed 404a, in such a manner that the first set of radar sensors 416a, . . . , 416j collectively define a virtual fence, referred to as a first outermost sterile field (OSF) 420a around the OR bed 404a. Similarly, a second set of radar sensors 416k, . . . , 416n from the plurality of radar sensors 416a, . . . , 416n may be installed at the outer boundary of another sterile object, for example, the surgical tray with the surgical tools 404b, in such a manner that the second set of radar sensors 416k, . . . , 416n collectively define another virtual fence, referred to as a second OSF 420d around the surgical tray with the surgical tools 404b. It should be noted that for exemplary purposes, there are shown ten radar sensors in the first set of radar sensors 416a, . . . , 416j and four radar sensors in the second set of radar sensors 416k, . . . , 416n, which should not be construed to be limiting. The number of radar sensors may be lower or higher based on various factors, such as strength of FOV desired and the size of the OR bed 404a and a surgical tray, without any deviation from the scope of the disclosure.

The first OSF 420a may be defined based on a FOV, configuration mode, and range of each of the first set of radar sensors 416a, . . . , 416j. In case the exemplary subject is located outside the first OSF 420a, the presence may not be deemed a threat, or at least not of a sufficient threat to output an alert. Similarly, the second OSF 420d may be defined based on a FOV, configuration mode, and range of each of the second set of radar sensors 416k, . . . , 416n. In case the exemplary subject is located outside the second OSF 420d, the presence may not be deemed a threat, or at least not of a sufficient threat to output an alert.

In an exemplary scenario, the first set of radar sensors 416a, . . . , 416j and the second set of radar sensors 416k, . . . , 416n may be further calibrated to define additional virtual fences. For example, an inner sterile field (ISF) 420b and a first CSF 420c may be additional virtual fences contained within the first OSF 420a and the first ISF 420b, respectively. In the other example, a second ISF 420e and a second CSF 420f may be additional virtual fences contained within the second OSF 420d and the second ISF 420e, respectively.

As shown in FIG. 4C, the first CSF 420c may be closest to the OR bed 404a, followed by the first ISF 420b. Thus, both the first CSF 420c and the first ISF 420b may be contained within the first OSF 420*a*. Similarly, the second CSF 420*f* may be closest to the surgical tray with the surgical tools 404*b* followed by the second ISF 420*e*. Thus, both the second CSF 420*f* and the second ISF 420*e* may be contained within the second OSF 420*d*. In the exemplary scenario, the range of the first OSF 420*a* and the second OSF 420*d* may be 54 cm, and the ranges of the first ISF 420*b* and the second ISF 420*e* may be 36 cm. Further, the ranges of the first CSF 420*c* and the second CSF 420*f* may be 18 cm.

Such a set of virtual fences, i.e., the first OSF 420*a*, the first ISF 420*b*, and the first CSF 420*c*, may detect the level of proximity of the exemplary subject, such as the non-clinician 408*d*, with respect to corresponding sterile object, i.e., the OR bed 404*a*. Similarly, the other set of virtual fences, i.e., the second OSF 420*d*, the second ISF 420*e*, and the second CSF 420*f*, may detect the level of proximity of the exemplary subject, such as the non-clinician 408*d*, with respect to the corresponding sterile object, i.e., the surgical tray with the surgical tools 404*b*. It should be noted that whilst there is shown only one instance of the first ISF 420*b* and the second ISF 420*e* in FIG. 4C, it should not be construed to be limiting. In various other scenarios, there may be multiple instances of the first ISF 420*b* and the second ISF 420*e* defined based on the calibration of the first set of radar sensors 416*a*, . . . , 416*j* and the second set of radar sensors 416*k*, . . . , 416*n*, respectively, without any deviation from the scope of the disclosure.

In accordance with various embodiments, the first OSF 420*a*, the inner sterile fields (such as the first ISF 420*b*), and the first CSF 420*c* may be adjustable and defined dynamically based on the calibration or configuration mode defined automatically by, for example the controller engine 224. In accordance with an embodiment, the boundaries of the first OSF 420*a* and the inner sterile fields (such as the first ISF 420*b*), may be determined based on a plurality of characteristics of the first set of radar sensors 416*a*, . . . , 416*j*. Similarly, the boundaries of the second OSF 420*d* and the inner sterile fields (such as the second ISF 420*e*), may be determined based on a plurality of characteristics of the second set of radar sensors 416*k*, . . . , 416*n*. Examples of the plurality of characteristics of each radar sensor may include, but are not limited to, an average transmitter power and the physical antenna size. Based on the plurality of characteristics, various other parameters, such as FOV, configuration mode and calibration of radar sensor may be determined. Therefore, in accordance with an embodiment, the boundary of the first OSF 420*a* and the inner sterile fields (such as the first ISF 420*b*) may be uniform when the plurality of characteristics of the first set of radar sensors 416*a*, . . . , 416*j* is the same. In accordance with another embodiment, the boundary of the first OSF 420*a* and the inner sterile fields (such as the first ISF 420*b*) may be non-uniform when the plurality of characteristics of the first set of radar sensors 416*a*, . . . , 416*j* is different. Similarly, the boundary of the second OSF 420*d* and the inner sterile fields (such as the second ISF 420*e*) may be uniform when the plurality of characteristics of the second set of radar sensors 416*k*, . . . , 416*n* is the same. In accordance with another embodiment, the boundary of the second OSF 420*d* and the inner sterile fields (such as the second ISF 420*e*) may be non-uniform when the plurality of characteristics of the second set of radar sensors 416*k*, . . . , 416*n* is different In accordance with an embodiment, the distance data may be transmitted by the distance sensors 214 to the controller engine 224 continuously for the complete time duration whenever the exemplary subject is detected to be breaching the first OSF 420*a* and the second OSF 420*d* and exceeding towards the corresponding sterile object, i.e., the OR bed 404*a* and the surgical tray with the surgical tools 404*b*, respectively, of at least one of the plurality of radar sensors 416*a*, . . . , 416*n* installed at the outer boundary of the corresponding sterile objects within the monitored enclosure, i.e., the operating room 402. In case the exemplary subject retracts, the distance sensors 214 may stop transmitting the distance data to the controller engine 224.

It should be noted that, in accordance with an embodiment, the multi-modal sensor data may be contemporaneously received from the three different modalities of sensing devices, as described above in the steps 302, 304 and 306. In accordance with another embodiment, one modality of sensing devices may trigger other modality (or modalities) of sensing devices upon detection of an event. In any case, the location data, the optical sensor data, and the distance data associated with each of the plurality of clinicians 408*a*, . . . , 408*c* and the non-clinician 408*d*, checking into, moving around, and/or performing a plurality of actions in the operating room 402, may be obtained and transmitted to the controller engine 224 for further analysis.

At 308, multi-modal sensor data associated with each exemplary subject performing a plurality of actions within the monitored enclosure may be correlated. In accordance with an embodiment, the controller engine 224 may be configured to correlate the multi-modal sensor data associated with each exemplary subject performing the plurality of actions within the monitored enclosure, i.e., the operating room 402.

In accordance with an embodiment, the controller engine 224 may be configured to receive the multi-modal sensor data at defined time intervals from multiple modalities, i.e., the plurality of sensing devices, located within the monitored enclosure, i.e., the operating room 402. The controller engine 224 may be configured to receive the multi-modal sensor data, i.e., the location data of multiple subjects, the gestures performed by the identified subjects, and distance data of each subject from sterile objects, from the plurality of sensing devices, i.e., the indoor positioning system 204, the optical sensing devices 210, and the distance sensors 214, respectively for a defined time duration. In accordance with an embodiment, the controller engine 224 may be one of the edge resources 104 or local to the SFC system 102. In such embodiment, the multi-modal sensor data may be received by the controller engine 224 from the plurality of sensing devices within the monitored enclosure, via various wired or wireless interfaces in the local area network 108*a*. In accordance with another embodiment, the controller engine 224 may be one of the cloud resources 106 or remote to the SFC system 102. In such embodiment, the multi-modal sensor data may be received by the controller engine 224 from the plurality of sensing devices within the monitored enclosure, via various wired or wireless interfaces in the combination of the local area network 108*a* and the wide area network 108*b*.

In accordance with an embodiment, the controller engine 224 may be configured to receive the multi-modal sensor data at defined time intervals simultaneously from the plurality of sensing devices located within the monitored enclosure. In accordance with another embodiment, the controller engine 224 may be configured to receive the multi-modal sensor data at defined time intervals at different timestamps from the plurality of sensing devices located within the monitored enclosure. In such embodiment, one modality of sensing devices may trigger other set(s) of sensing devices upon detection of an event. For example, when there is no one in the monitored enclosure, the plurality of sensing devices may stay in sleep mode. As soon as an exemplary subject checks in, the mode of the optical sensing devices 210 and the indoor positioning system 204 changes to awake mode. The distance sensors 214 may be triggered only when the exemplary subject attempts to breach an outermost sterile field of a sterile object in the monitored enclosure.

In accordance with an embodiment, as shown in FIGS. 4A to 4C, the controller engine 224 may receive the location data associated with each subject, such as the plurality of clinicians 408a, ..., 408c and the non-clinician 408d, within the operating room 402 from the plurality of UWB anchors 406a, ..., 406d. The location data may correspond to the location of each of the plurality of tags 410a, ..., 410c associated with corresponding personnel from the plurality of clinicians 408a, ..., 408c and the non-clinician 408d within the operating room 402. It should be noted herein that different tags may be worn differently by the plurality of clinicians 408a, ..., 408c and the non-clinician 408d in the operating room 402. For example, the surgeon 408a may be wearing the first portable electronic device 412a, such as a smart band, on the wrist to which the first tag 410a is attached. On the other hand, the scrub nurse 408b may be carrying the second portable electronic device 412b, such as a smartphone, which may be connected with the second tag 410b embedded in a passive ID card worn around the neck. The circulating nurse 408c may be associated with a third portable electronic device 412c, such as a smartwatch, to which the third tag 410c is attached. Whilst not shown in FIG. 4C, but the non-clinician 408d may also be carrying a portable electronic device, such as a tablet, and wearing a visitor badge 412d to which a fourth tag 410d may be attached.

In accordance with an embodiment, as shown in FIGS. 4A to 4C, the controller engine 224 may receive the optical sensor data captured by the plurality of cameras 414a, ..., 414d within the operating room 402. In accordance with an embodiment, the controller engine 224 may also receive the optical sensor data transformed into the vector space that identifies the subjects, and recognizes the gestures, activities, and tasks performed by each of the plurality of clinicians 408a, ..., 408c and the non-clinician 408d. The captured optical sensor data captured may also pertain to the states of the plurality of objects 404a, ..., 404g located within the operating room 402.

In accordance with an embodiment, as shown in FIGS. 4A to 4C, the controller engine 224 may receive the distance data captured by the plurality of radar sensors 416a, ..., 416n located at the boundary of each of the corresponding sterile objects, for example, the OR bed 404a and the surgical tray with the surgical tools 404b, within the operating room 402. The distance data may correspond to the distance between the boundary of a sterile object and an exemplary subject approaching the sterile object.

Based on the multi-modal sensor data received from different sensing devices, the controller engine 224 may be configured to derive correlated multi-modal sensor data that is based on a plurality of attributes for each subject. Examples of the attributes may include, but are not limited to, the gestures performed by each subject, physiological parameters and biometric information associated with each subject, a combination of behavioral data, body language and posture data of each subject, location data within the monitored enclosure, and the distance data of each subject from the sterile objects. The correlation may be derived based on, for example, same timestamps, during occurrence of same event (for example performing each of the set of activities and each of the set of designated tasks) and/or the like.

In accordance with an embodiment, the correlation of the multi-modal sensor data may enhance the veracity of detection of a non-compliant activity, or a non-designated task being performed by each subject in the monitored enclosure. For example, an exemplary sensor data may pertain to the surgeon 408a being tracked approaching a scrub sink and identified as being located next to a scrub sink for a time duration (received from the plurality of UWB anchors 406a, ..., 406d) and raising a hand to turn on the tap and then using the elbow on the soap dispenser to dispense the soap on the other hand captured as the gestures and/or posture data of the surgeon 408a (received from the plurality of cameras 414a, ..., 414d). The controller engine 224 may derive a correlation from the exemplary sensor data to determine that the activity being performed is a compliant activity as the surgeon 408a is going to scrub his hands with soap, and further differentiate, for example, from the cases where the surgeon 408a is performing random motions with his/her hands in the air (which corresponds to an abnormal event) or merely washing his hands without soap (which corresponds to a non-compliant activity). Thus, the controller engine 224 may confirm the veracity of detection of a compliant activity by deriving a correlation that is similar to previous combinations of similar location, gesture, and posture changes in similar context known to be the compliant activity as retrieved from the data store 226. The correlated multi-modal sensor data may provide various facets of information in accordance with multiple contexts, as discussed below.

In accordance with a first context, the controller engine 224 may use the data store 226 to determine an association of a tag identifier (e.g., a tag UID) of each tag with corresponding clinician from the plurality of clinicians 408a, ..., 408c and the non-clinician 408d within the operating room 402. The data store 226 may further store a data repository that may comprise profile data pertaining to each clinician within the operating room 402. Examples of the profile data may include, but are not limited to, user ID/employee number, designation, role data, responsibilities data, biometric data, license number, team ID, performance data, social security number, credit card information, employment data, inventory data, and other data that may be apparent to one of skill in the art in view of the foregoing description. The data repository may further include daily log of each clinician indicating action items to be completed during each day, mapping of each clinician with assigned patients, schedule of procedures and operations to be performed on associated patients, and the like.

In accordance with a second context, the correlated multi-modal sensor data may provide inferred distance vectors that pertain to distance of each of the plurality of clinicians 408a, ..., 408c and the non-clinician 408d with respect to the plurality of sterile objects 404a, ..., 404d within the operating room 402. Specifically, normal distance vectors may correspond to proximity and orientation of the most infection-prone body part of the clinician, i.e., the hands, with respect to the plurality of sterile objects 404a, ..., 404d in the operating room 402. Such distance vectors may be solely based on the sensor data received from the indoor positioning system 204 when the tag is located at or near the most infection-prone body part of the clinician. For example, the surgeon 408a may be associated with the first portable electronic device 412a, such as a smart band, on the wrist to which the first tag 410a is attached.

However, when the tag is not located at or near the most infection-prone body part of the clinician, the controller engine 224 may be configured to infer distance vectors based on the multi-modal sensor data. For example, the scrub nurse 408b may be associated with the second portable electronic device 412b, such as a passive ID card around the neck, to which the second tag 410b is attached. In such case, the position of the second tag 410b is quite far away from the hands of the scrub nurse 408b, which may not be indicative of the exact position of the hands if relied solely on the location data provided by the indoor positioning system 204. In such case, the exact location of the hands of the scrub nurse 408b may be determined based on the additional data provided by the optical sensing devices 210. Further, the controller engine 224 may be configured to determine that how far are the hands of each clinician or non-clinician from the plurality of sterile objects 404a, . . . , 404d in the operating room 402. In such an embodiment, the controller engine 224 may utilize the point cloud provided by the plurality of radar sensors 416a, . . . , 416n (as described above) to infer the distance vectors.

In accordance with a third context, the correlated multi-modal sensor data may provide movement trajectory of the hands of each identified clinician tracked in various positions or postures within the operating room 402. For example, based on the correlated multi-modal sensor data, the controller engine 224 may be configured to determine movement of each clinician, i.e., who is performing which activities and tasks at what time in the operating room 402 (as a log record), thus associate an identity of each clinician with corresponding activities and tasks being performed in the operating room 402. The controller engine 224 may be configured to store the log records back to the data store 226 for future references and audits to track the movement of each clinician in the operating room 402 at date/time-of-interest. In accordance with an embodiment, an identity of each clinician for corresponding log records may be encrypted and recorded in terms of IDs. In accordance with another embodiment, the identity of each clinician for corresponding log records may not be encrypted and recorded directly.

At 310, a classification model may be trained based on training datasets pertaining to the movement pattern or the plurality of actions derived from the correlated multi-modal sensor data. In accordance with an embodiment, the ML engine 216 may be configured to train a classification model based on training datasets pertaining to the movement pattern or the plurality of actions derived from the correlated multi-modal sensor data. Accordingly, the ML engine 216 may be configured to generate a prediction about likelihood of an input action being classified with an output classification label based on the trained classification model.

In accordance with an embodiment, various machine learning approaches corresponding to statistical classification meta-algorithm, such as AdaBoost, may be utilized to train the classification model. The classification model may be trained using training datasets pertaining to labeled movement pattern or the plurality of actions, such as samples of permissible (compliant activity or designated task) and non-permissible (non-compliant activity or non-designated task) movement pattern or the plurality of actions performed by multiple subjects within the monitored enclosure. For example, sterile personnel performing the activity of gowning followed by scrubbing and non-sterile personnel touching the plurality of sterile objects 404a, . . . , 404d are non-permissible actions (non-compliant activities). On the other hand, the sterile personnel performing the activities of scrubbing, gowning, and gloving are permissible actions (compliant activities). Further, sterile personnel touching a non-sterile object, such as chair and electrical switches, or doing the task of a non-sterile personnel are non-permissible actions (non-compliant activity and non-designated task respectively).

The classifiers may correspond to ML algorithms that employ sophisticated mathematical and statistical methods to generate predictions about the likelihood of input datasets being classified in a specific manner. In accordance with an embodiment, the classifiers may be unsupervised classifiers that may be fed the training datasets pertaining to unlabeled movement pattern or the plurality of actions, which the classifiers may classify according to pattern recognition or structures and anomalies in the datasets. In accordance with another embodiment, supervised and semi-supervised classifiers are fed with the training datasets pertaining to the movement pattern or the plurality of actions, from which the classifiers may learn to classify data according to predetermined categories.

The trained classification model may statistically predict whether input datasets pertaining to the movement pattern, or the plurality of actions is either permissible (compliant or designated) or non-permissible (non-compliant or non-designated) with respect to standard activities and designated tasks meant for corresponding subject. For example, for the surgeon 408a, scrubbing and gowning (sans gloving) may be predicted to be non-compliant activities and thus, examining the patient 418 may be predicted to be non-designated task (for maintaining sterile field) as the surgeon 408a is sterile personnel and the gloving activity cannot be compromised. On the other hand, for the circulating nurse 408c, gowning and gloving (even if scrubbing is not performed) may be predicted to be compliant activities. However, touching the patient 418 may be predicted to be non-designated task for the circulating nurse 408c as the circulating nurse 408c is non-sterile personnel.

At 312, the exemplary subject may be authorized to selectively perform a set of designated tasks based on contextual analysis of the correlated multi-modal sensor data, the set of parameters retrieved from a data store 226, and/or a set of activities performed by the exemplary subject. In accordance with an embodiment, the authorization system 222a may be configured to authorize the exemplary subject to selectively perform a set of designated tasks based on contextual analysis of the correlated multi-modal sensor data, the set of parameters retrieved from a data store 226, and/or the set of activities performed by the exemplary subject. In accordance with an embodiment, the set of parameters may comprise pre-defined rules associated with each of the set of designated tasks retrieved from the data store 226, a list of responsibility exclusions defined for the exemplary subject, a set of protocols pertaining to responsibilities and duties defined for the exemplary subject in a workflow, and identification data and credentials read from a portable device associated with the exemplary subject. In accordance with an embodiment, information pertaining to the set of activities and the set of designated tasks performed by the exemplary subject may be obtained based on the correlated multi-modal sensor data.

In accordance with an embodiment, the contextual analysis may be performed, for example, by an automated learning module of the ML engine 216, based on supervised learning or unsupervised learning methods. The contextual analysis may be performed based on a learned routine dataset stored within the data store 226. The data store 226 may store one or more designated and/or non-designated tasks for each exemplary subject, as described above. Accordingly, an unauthorized task (i.e., not recorded in the data store 226) and an authorized task (i.e., recorded in the data store 226) may be identified. The data store 226 may further store learned dataset representing combinations of tracked location data of the exemplary subject correlated with the gesture and/or posture data representing different tasks, and/or distance data of the exemplary subject from sterile objects. Accordingly, it may be determined whether the exemplary subject is authorized or unauthorized to perform the set of designated tasks.

In accordance with an embodiment, the authorization system 222a may dynamically authorize a next designated task based on an acknowledgement of the successful completion of the previous designated task. In certain cases, the exemplary subject may provide voice-based feedback to provide the acknowledgement of the completion of the previous designated task. In other cases, the exemplary subject may provide gesture feedback (captured by the plurality of cameras 414a, . . . , 414d) to provide the acknowledgement of the completion of the previous designated task.

In accordance with an embodiment, based on the statistical prediction by the trained classification model, the authorization system 222a may be configured to authorize the exemplary subject to selectively perform a set of designated tasks based on the contextual analysis of the correlated multi-modal sensor data, the compliance of the set of activities performed by the exemplary subject with a pre-defined sequence of activities, and the set of parameters retrieved from the data store 226. Such an embodiment may correspond to the sterile personnel in the operating room 402 for whom the compliance of the set of activities performed by the exemplary subject with a pre-defined sequence of activities is mandatory. For example, the authorization system 222a may be configured to authorize the surgeon 408a to selectively perform a set of designated tasks (i.e., performing surgical procedure on the patient 418, ensuring the patient 418 is tolerating the procedure, and ensuring the surgical team is working at peak performance) based on the correlated multi-modal sensor data (i.e., the location data of the surgeon 408a correlated with the movement trajectory and the distance vector position information about the subject, gestures performed by the subject, movement trajectory data of the subject and distance vectors that pertain to distance of the subject with respect to one or more objects within the monitored enclosure), the compliance of the set of activities performed by the surgeon 408a with a pre-defined sequence of activities (i.e., scrubbing, gowning, and gloving), and the set of parameters (i.e., surgery scheduled for the patient 418 for a given date/time).

In accordance with another embodiment, based on the statistical prediction by the trained classification model, the authorization system 222a may be configured to authorize the exemplary subject to selectively perform a set of designated tasks based on the contextual analysis of the correlated multi-modal sensor data and the set of parameters retrieved from the data store 226. Such an embodiment may correspond to the non-sterile personnel in the operating room 402 for whom the compliance of the set of activities performed by the exemplary subject with a pre-defined sequence of activities may not be mandatory. For example, the authorization system 222a may be configured to authorize the circulating nurse 408c to selectively perform a set of designated tasks (i.e., reviewing assessments of the patient 418 prior to the operation, inspecting surgical equipment to determine everything is in working order, confirming the identity of the patient 418 and verifying that necessary consent forms are completed and are in order, open the sterile packaging, and determining how the patient 418 will be cared for) based on the correlated multi-modal sensor data (i.e., the location data of the circulating nurse 408c correlated with the movement trajectory and the distance vector position information about the subject, gestures performed by the subject, movement trajectory data of the subject and distance vectors that pertain to distance of the subject with respect to one or more objects within the monitored enclosure) and the set of parameters (i.e., responsibility exclusion, such as not touching the plurality of sterile objects 404a, . . . , 404d within the operating room 402). In such embodiment, the set of activities may not be mandatory (though preferred to maintain the sterility of the operating room 402) for the circulating nurse 408c to be performed, hence can be skipped.

In accordance with another embodiment, based on the statistical prediction by the trained classification model, the authorization system 222a may be configured to authorize the non-clinician 408d (such as the birth support partner of the patient 418) to only perform the set of activities to maintain the sterility but not perform any task in the operating room 402. For example, the authorization system 222a may be configured to authorize the non-clinician 408d to only check-into the operating room 402, perform the set of activities, and be present near the patient 418 to provide emotional support without breaching the sterile field of the incision site 404d. The authorization system 222a may be configured to authorize the non-clinician 408d to only observe based on the correlated multi-modal sensor data (i.e., the location data of the non-clinician 408d correlated with the movement trajectory and the distance vector position information about the non-clinician 408d, gestures performed by the non-clinician 408d, movement trajectory data of the subject and distance vectors that pertain to distance of the non-clinician 408d with respect to one or more objects within the operating room 402) and a set of parameters (for example, exclusion from any role and responsibility in the operating room 402 and present near the patient 418 without breaching the sterile field of the incision site 404d).

At 314, a corrective action may be recommended to be taken corresponding to a non-compliant activity or a non-designated task performed by the exemplary subject based on the pre-defined sequence of activities and the set of parameters retrieved from the data store 226. In accordance with an embodiment, the AI engine 218 may be configured to recommend the corrective action to be taken corresponding to a non-compliant activity or a non-designated task performed by the exemplary subject based on the pre-defined sequence of activities and the set of parameters retrieved from the data store 226. The recommendation may be based on applying intelligent reasoning by the AI engine 218 based on the correlated multi-modal sensor data and classification by the ML engine 216. Based on such reasoning, the AI engine 218 may generate educated and more informed decisions. The recommended corrective action may be rendered as feedback on the portable device 230 associated with the exemplary subject 232 in the predefined mode, such as audio feedback, visual feedback, haptic feedback, or a combination thereof. In accordance with an embodiment, the recommended corrective action may be further rendered on the user interface 228 for monitoring by the external sterile manager 236. In accordance with an embodiment, the recommended corrective action may be stored in the data store 226 as training dataset/sample for training the classification model by the ML engine 216 and future references.

The AI engine 218 may be configured to facilitate reducing adverse outcomes of the SFC system 102, enable the SFC system 102 to learn from experience, adjust to new input datasets and perform human-like tasks using output of the ML engine 216. The evaluation engine 218a in the AI engine 218 may be configured to evaluate the set of activities performed by the exemplary subject and the set of tasks designated for the exemplary subject to identify issues and generate observations about the scenario to facilitate making more intelligent and informed decisions.

The evaluation engine 218a may be further configured to perform event identification and risk assessment. The event may correspond to an occurrence of an error, an improper performance, a non-required performance, or a failure to perform an aspect of a set of designated tasks or an activity. The event may be reflected in the correlated multi-modal sensor data, workflow data, and/or facility data, which warrants immediate attention and/or a response.

The event may be related to a specific behavioral pattern of a single clinician or a group of clinicians from the plurality of clinicians 408a, . . . , 408c and the non-clinician 408d or occurrence of an undesired or skipped activity or task by the single clinician or the group of clinicians from the plurality of clinicians 408a, . . . , 408c and the non-clinician 408d within an area of the operating room 402 or the entire area of the operating room 402. For example, the event may correspond to demonstration of a level of fatigue or attentiveness of a clinician that is below a level required for provision of quality care. In another example, the event may correspond to the clinician performing or about to perform a procedure or steps that the clinician is not authorized to perform or that the clinician has demonstrated low proficiency in performing correctly. In accordance with an embodiment, the event may correspond to improper number and/or distribution of clinicians within the operating room 402.

In accordance with an embodiment, the event may be further related to an occurrence of state change of a single object or a group of objects from the plurality of objects 404a, . . . , 404g within an area of the operating room 402 or the entire area of the operating room 402. In accordance with an embodiment, the event associated within the area of the operating room 402 or the entire area of the operating room 402 may correspond to an inadequate resources or distribution of resources and malfunction of an object that influence the ability to perform relevantly in the operating room 402.

It should be noted that the events described above are merely exemplary and many additional types of events associated with a specific application area, such as healthcare, may be considered that warrant performance of a response. Further, it should be noted that the events may involve a combination of different parameters associated with the clinicians, objects, the workflow, the correlated multi-modal sensor data, and/or the data associated with the operating room 402.

In accordance with an embodiment, the evaluation engine 218a may perform the risk assessment to determine whether the event should be considered significant or not based on determination of a risk score with the identified event. For example, a non-compliance of even one activity from the set of activities performed by the surgeon 408a or touching a non-sterile object by the surgeon 408a or the scrub nurse 408b may be some of the events that may be classified as significant as the corresponding risk score exceeds a defined threshold value.

In accordance with another embodiment, the evaluation engine 218a may perform the risk assessment to determine whether the event should be considered low, medium, or high-risk, based on determination of the risk score based on multiple threshold values. For example, touching a non-sterile object by the non-clinician 408d may be an event that may be determined as a low-risk as the corresponding risk score is between a first set of defined threshold values. In another example, touching a non-sterile object by the circulating nurse 408c may be an event that may be determined as a low-risk as the corresponding risk score is between a second set of defined threshold values. In another example, touching a non-sterile object by the surgeon 408a and the scrub nurse 408b may be the events that may be determined as a high-risk as the corresponding risk score is between a third set of defined threshold values.

In accordance with an embodiment, the evaluation engine 218a may be configured to associate severity level of the consequence with the risk score. Accordingly, the evaluation engine 218a may deduce a permissible level corresponding to low-risk events, reducible level corresponding to the medium-risk score and non-permissible level with the high-risk score.

In accordance with yet another embodiment, the events may be classified as warranting attention or acknowledgment verses events warranting an immediate response based on the magnitude of the risk score, such as medium-risk score and high-risk score, respectively. It should be noted that other classification schemes including additional categories of risk may be employed, without deviation from the scope of the disclosure.

The recommendation engine 218b in the AI engine 218 may be configured to recommend a corrective action to be taken corresponding to a non-compliant activity or a non-designated task performed by the exemplary subject based on the pre-defined sequence of activities and the set of parameters retrieved from the data store 226, and the output of the evaluation engine 218a. The recommendation engine 218b may be configured to determine or infer one or more responses and provide such one or more responses as the recommendation to the subjects corresponding to the identified events.

For example, if an event corresponds to a breach of an outermost sterile field at a OR bed 404a by an unauthorized subject, the recommendation engine 218b may generate a response warranting that the unauthorized subject should immediately retract from the OR bed 404a. In one scenario, the unauthorized subject does not retract and further proceeds towards the OR bed 404a and breaches the inner sterile fields. In such case, the recommendation engine 218b may generate a response warranting other subjects managing the unauthorized subject for an immediate action to be taken against the exemplary subject.

In another example, if the event corresponds to a skipped or missed activity by an exemplary subject, the recommendation engine 218b may generate a response advising the exemplary subject to go back and repeat the process. For example, if the exemplary subject did not remove the watch while scrubbing, the generated response may advise the exemplary subject to remove the watch and then again start with the scrubbing activity.

In another example, if the event corresponds to a designated task being inadequately performed by an exemplary subject, the recommendation engine 218b may modify the workflow of an associated subject and generate a response for both the exemplary subject and the associated subject. For example, a deputy from the surgical team did not mark the operative site properly and a part of the marking appears unclear to the surgeon 408a. Based on the facial expressions and behavioral pattern of the surgeon 408a indicated by the correlated multi-modal sensor data and corresponding inputs from the evaluation engine 218a, the recommendation engine 218b may modify the workflow of the scrub nurse 408b to confirm the surgical site from the notes, parental consent form, preoperative radiographs, and using image intensifiers.

In accordance with an embodiment, the recommendation engine 218b may simply continue to confirm proper completion of each activity and/or task by the exemplary subject. In such case, the recommendation engine 218b may further recommend the next activity and/or task that should be performed by the exemplary subject. Such an arrangement may be helpful for newly inducted team members of the exemplary subject.

At 316, a notification may be generated as feedback in accordance with a predefined mode for at least an unauthorized subject and the external sterile manager 236 based on at least one of a detection of an event associated with an unauthorized action performed by the unauthorized subject or a breach of the outermost sterile field, the inner sterile fields and the critical sterile field around the sterile object based on the distance data between the sterile object and the unauthorized subject. In accordance with an embodiment, the alert system 222b may be configured to generate the notification as the feedback in accordance with the predefined mode for at least the unauthorized subject and the external sterile manager 236 based on the detection of the event associated with the unauthorized action performed by the unauthorized subject. The alert system 222b may be further configured to generate the notification as the feedback in accordance with the predefined mode for the breach of the outermost sterile field, the inner sterile fields and the critical sterile field around the sterile object based on the distance data between the sterile object and the unauthorized subject. The predefined mode may be one or more of visual, audible, audio-visual, or haptic feedback mode.

In one embodiment, the exemplary subject may be deemed to be as the unauthorized subject when the set of activities performed by the exemplary subject is non-compliant with respect to the pre-defined sequence of activities stored in the data store 226. For example, the surgeon 408a is an unauthorized subject when he skips the scrubbing activity before performing the surgery (which is the designated task). In another embodiment, the exemplary subject may be deemed to be as the unauthorized subject when the exemplary subject is an ineligible personnel and performs non-designated tasks. For example, the non-clinician 408d is an unauthorized subject as he is not from the surgical team, and the non-clinician 408d attempts to touch any sterile object in the operating room 402. In yet another embodiment, the exemplary subject may be deemed to be as the unauthorized subject when the exemplary subject performs the set of activities that is compliant but performs non-designated tasks. For example, the circulating nurse 408c is an unauthorized subject when he attempts to pass a surgical instrument to the surgeon 408a during the surgery.

In accordance with an embodiment, the notification may be generated in response to the unauthorized subject, for example the circulating nurse 408c or the non-clinician 408d, attempting to breach the first OSF 420a around a sterile object, such as the OR bed 404a of the patient 418. In such case, the attempt to breach the first OSF 420a around the sterile object may be deemed to be as the event. The generated notification may be rendered at the portable device 230 at a basic alert level in accordance with the predefined mode. For example, the circulating nurse 408c associated with the third portable electronic device 412c, i.e., the smartwatch, attached with the third tag 410c, may try to move towards the OR bed 404a. As the circulating nurse 408c is unauthorized to touch the OR bed 404a, the alert system 222b may generate a feeble vibratory output at the third portable electronic device 412c, i.e., the smartwatch, upon the breach of the first OSF 420a, around 54 cm, around the OR bed 404a.

In accordance with an embodiment, the generated notification may be rendered at the portable device 230 and additional portable devices at advanced alert levels in response to breach of inner or critical sterile fields around the sterile object. For example, if the unauthorized subject, such as the circulating nurse 408c, fails to retract and still moves towards the OR bed 404a, the alert system 222b may generate a stronger vibratory output rendered at the third portable electronic device 412c upon the breach of the first ISF 420b, about 36 cm, around the OR bed 404a. Further, the alert system 222b may generate a strongest vibratory output at the third portable electronic device 412c upon the breach of the first CSF 420c, about 18 cm, around the OR bed 404a. In accordance with an embodiment, the alert system 222b may be further configured to generate notifications for additional portable devices, for example, portable devices associated with managers, supervisors, or peers associated with the unauthorized subject, i.e., the circulating nurse 408c, in response to the breach of any of the sterile fields around the sterile object. In accordance with another embodiment, the notification, generated as the feedback for the unauthorized subject, may also be displayed at the output devices (for example, the display interface, the speaker, the other such mechanism capable of presenting an output) of the user interface 228 for the external sterile manager 236 for overall monitoring of the operating room 402.

Figure 5:
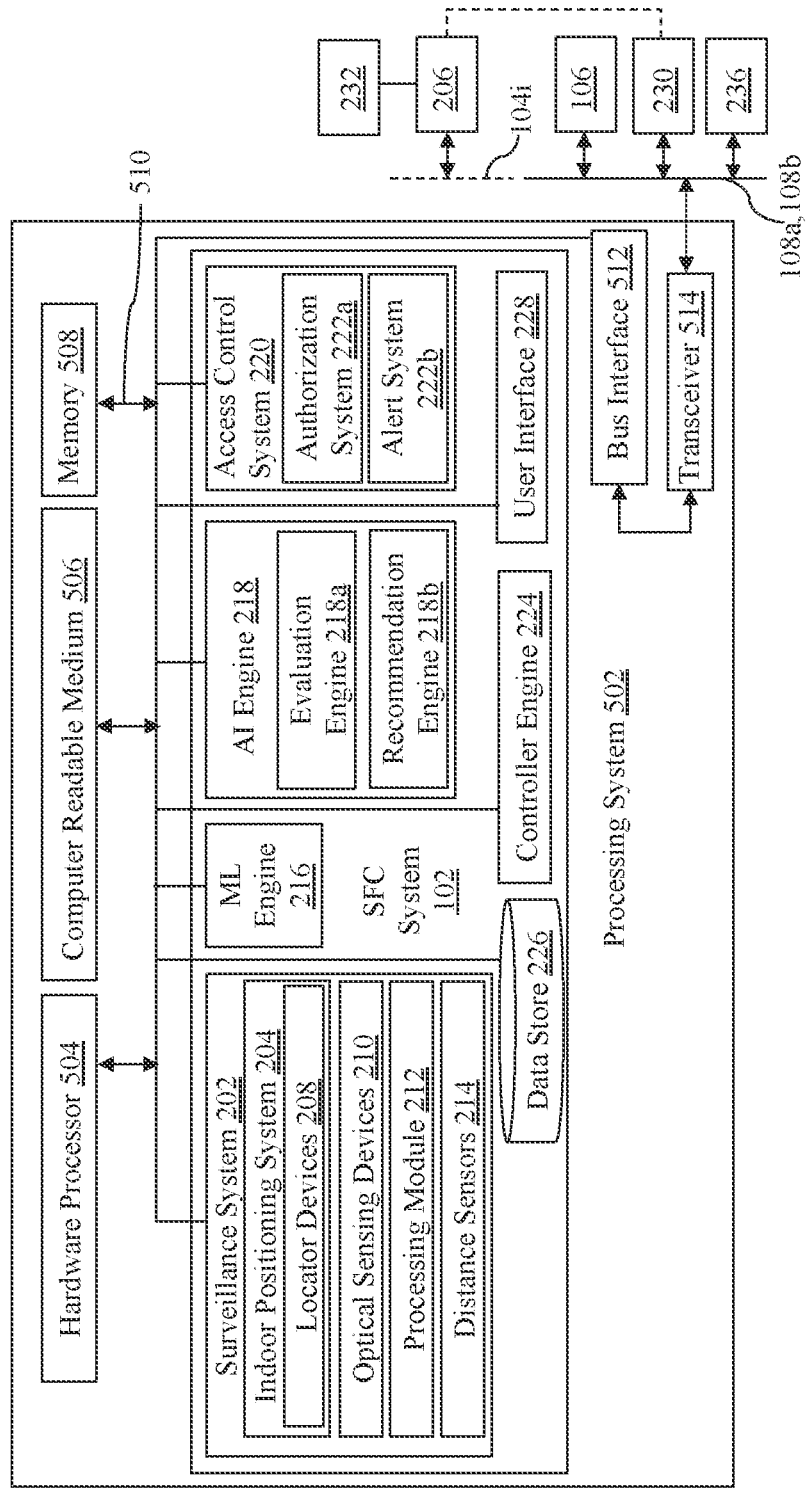
FIG. 5 is a conceptual diagram illustrating an example of a hardware implementation for the SFC system of FIG. 2 employing a processing system for maintaining sterile fields in a monitored enclosure, in accordance with an exemplary embodiment of the disclosure.

FIG. 5 is a conceptual diagram illustrating an example of a hardware implementation for the SFC system of FIG. 2 employing a processing system for maintaining sterile fields in a monitored enclosure, in accordance with an exemplary embodiment of the disclosure. Referring to FIG. 5, the hardware implementation shown by a representation 500 for the SFC system 102 employs a processing system 502 for maintaining sterile fields in the monitored enclosure, in accordance with an exemplary embodiment of the disclosure, as described herein.

In some examples, the processing system 502 may comprise one or more hardware processors, such as a processor 504, a non-transitory computer-readable medium 506, a memory 508, a bus 510, a bus interface 512, and a transceiver 514. FIG. 5 further illustrates the surveillance system 202 (comprising the indoor positioning system 204, the optical sensing devices 210, the processing module 212, and the distance sensors 214), the ML engine 216, the AI engine 218, the access control system 220 (comprising the authorization system 222a and the alert system 222b), the controller engine 224, the data store 226, and the user interface 228 as described in detail in FIG. 2.

The processor 504 may be configured to execute or implement software, hardware, and/or firmware modules and manage the bus 510 and general processing, including the execution of a set of instructions stored on the non-transitory computer-readable medium 506. The set of instructions, when executed by the processor 504, causes the SFC system 102 to execute the various operations described herein for any particular apparatus. The processor 504 may be implemented, based on a number of processor technologies known in the art. Examples of the hardware processor realized as the processor 504 may be a RISC processor, an ASIC processor, a CISC processor, and/or other processors or control circuits. In accordance with various embodiment, the processor 504 may include a single or multiple set of processors or multi-core processors. Moreover, the processor 504 may be implemented as an integrated processing system and/or a distributed processing system.

The non-transitory computer-readable medium 506 may be used for storing data that is manipulated by the processor 504 when executing the set of instructions. The data is stored for short periods or in the presence of power. The non-transitory computer-readable medium 506 may also be configured to store data for one or more of the surveillance system 202 (comprising the indoor positioning system 204, the optical sensing devices 210, the processing module 212, and the distance sensors 214), the ML engine 216, the AI engine 218, the access control system 220 (comprising the authorization system 222a and the alert system 222b), the controller engine 224, the data store 226, and the user interface 228, as described in detail in FIG. 2.

The memory 508, such as for storing local versions of applications being executed by the processor 504, related instructions and corresponding parameters. The memory 508 may include a type of memory usable by a computer, such as random-access memory (RAM), read only memory (ROM), tapes, magnetic discs, optical discs, volatile memory, non-volatile memory, and any combination thereof. Additionally, the processor 504 and the memory 508 may include and execute an operating system executing on the processor 504, one or more applications and display drivers and/or other components.

The bus 510 is configured to link together various circuits. In this example, the SFC system 102 employing the processing system 502, the processor 504, the non-transitory computer-readable medium 506, and the memory 508 may be implemented with bus architecture, represented by bus 510. The bus 510 may include any number of interconnecting buses and bridges depending on the specific implementation of the SFC system 102 and the overall design constraints. The bus interface 512 may be configured to provide an interface between the bus 510 and other circuits, such as, transceiver 514.

The transceiver 514 may be configured to provide a communication of the SFC system 102 with various other external systems, such as the cloud resources 106, the portable device 230, and the external sterile manager 236. The transceiver 514 may communicate via wireless communication with networks, such as the Internet, the Intranet and/or a wireless network, such as a cellular telephone network, a wireless local area network (WLAN) and/or a metropolitan area network (MAN). The wireless communication may use any of a plurality of communication standards, protocols and technologies, such as Global System for Mobile Communications (GSM), Enhanced Data GSM Environment (EDGE), Long Term Evolution (LTE), wideband code division multiple access (W-CDMA), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), and/or Wi-MAX. In accordance with an embodiment, the transceiver 514 may provide for establishing and maintaining communications, such as UWB communications, with one or more other devices, parties, entities, and the like, utilizing hardware, software, and services. For example, the transceiver 514 may provide for establishing and maintaining the short-range communication protocol, such as the UWB communication protocol 104i, with the set of tags 206 attached to or embedded in the various instances of the portable device 230 associated with the various instances of the subject 232. In accordance with the exemplary scenario as illustrated in FIGS. 4A to 4C, the transceiver 514 may provide for establishing and maintaining the UWB communication protocol 104i with the plurality of tags 410a, ..., 410c attached to or embedded in the plurality of portable electronic devices 412a, ..., 412c carried by the plurality of clinicians 408a, ..., 408c and the non-clinician 408d.

It should be recognized that, in some embodiments of the disclosure, one or more components of FIG. 5 may include software whose corresponding code may be executed by at least one processor, across multiple processing environments. For example, the surveillance system 202 (comprising the indoor positioning system 204, the optical sensing devices 210, the processing module 212, and the distance sensors 214), the ML engine 216, the AI engine 218, the access control system 220 (comprising the authorization system 222a and the alert system 222b), the controller engine 224, the data store 226, and the user interface 228 may include software that may be executed across a single or multiple processing environments.

In an aspect of the disclosure, the processor 504, the non-transitory computer-readable medium 506, or a combination of both may be configured or otherwise specially programmed to execute the operations or functionality of the surveillance system 202 (comprising the indoor positioning system 204, the optical sensing devices 210, the processing module 212, and the distance sensors 214), the ML engine 216, the AI engine 218, the access control system 220 (comprising the authorization system 222a and the alert system 222b), the controller engine 224, the data store 226, and the user interface 228, or various other components described herein, as described with respect to FIG. 2.

Various embodiments of the disclosure comprise the SFC system 102 that may be configured to maintain sterile fields in a monitored enclosure. The SFC system 102 may comprise, for example, the surveillance system 202 (comprising the indoor positioning system 204 (comprising the set of tags 206 and the set of locator devices 208), the optical sensing devices 210, the processing module 212, and the distance sensors 214), the ML engine 216, the AI engine 218, the access control system 220 (comprising the authorization system 222a and the alert system 222b), the controller engine 224, and the data store 226. The SFC system 102 includes a memory, such as the memory 508, for storing instructions and a processor, such as the processing system 502, for executing the instructions. Based on the executed instructions, one or more processors in the SFC system 102, such as the controller engine 224, may be configured to correlate multi-modal sensor data associated with an exemplary subject, such as the subject 232, performing a plurality of actions within the monitored enclosure, such as the operating room 402. The multi-modal sensor data may be received at defined time intervals from a plurality of sensing devices, such as the indoor positioning system 204, the optical sensing devices 210, and the distance sensors 214, located within the monitored enclosure, such as the operating room 402. The one or more processors in the SFC system 102, such as the authorization system 222a, may be configured to authorize the exemplary subject, such as the subject 232, to selectively perform a set of designated tasks based on contextual analysis of the correlated multi-modal sensor data, the set of parameters retrieved from the data store 226, and/or a set of activities performed by the subject 232. The one or more processors in the SFC system 102, such as the alert system 222b, may be configured to generate a notification, via the portable device 230 via the portable device 230 via associated with an unauthorized subject, based on detection of an event associated with an unauthorized action performed by the unauthorized subject.

In accordance with an embodiment, the set of parameters may comprise pre-defined rules associated with each of the set of designated tasks retrieved from the data store 226, a list of responsibility exclusions defined for the subject 232, a set of protocols pertaining to responsibilities and duties defined for the subject 232 in a workflow, and identification data and credentials read from the portable device 230 associated with by the subject 232.

In accordance with an embodiment, the correlated multi-modal sensor data may correspond to location data of the subject 232, gestures performed by identified subject 232, and distance data that pertains to distance of the subject 232 with respect to a sterile object within the monitored enclosure.

In accordance with an embodiment, the plurality of actions may comprise the set of activities and the set of designated tasks. The unauthorized action performed by the unauthorized subject may correspond to at least one of a non-compliant activity and/or a non-designated task.

In accordance with an embodiment, the one or more processors in the SFC system 102, such as the controller engine 224, may be configured to receive location data of the subject 232 within the monitored enclosure from a first modality of sensing devices. The first modality of sensing devices may correspond to the indoor positioning system 204.

In accordance with an embodiment, the indoor positioning system 204 may correspond to at least one of an electromagnetic radiation-based system, sound-based system, radio frequency-based system, or non-radio frequency-based system.

In accordance with an embodiment, the one or more processors in the SFC system 102, such as the controller engine 224, may be configured to receive optical sensor data associated with the subject 232 within the monitored enclosure from a second modality of sensing devices. The second modality of sensing devices may correspond to the optical sensing devices 210. The optical sensor data may be transformed into a vector space to identify gestures performed by the subject 232 within the monitored enclosure.

In accordance with an embodiment, the one or more processors in the SFC system 102, such as the controller engine 224, may be configured to receive distance data of the subject 232 with respect to a sterile object from a third modality of sensing devices. The third modality of sensing devices may correspond to distance sensors 214. The distance sensors 214 may be installed at outer boundary of the sterile object.

In accordance with an embodiment, the one or more processors in the SFC system 102, such as the ML engine 216, may be configured to train a classification model based on training datasets pertaining to the movement pattern or the plurality of actions derived from the correlated multi-modal sensor data. The ML engine 216, may be configured to generate a prediction about likelihood of an input action being classified with an output classification label based on the trained classification model.

In accordance with an embodiment, the one or more processors in the SFC system 102, such as the recommendation engine 218b, may be configured to recommend a corrective action to be taken corresponding to a non-compliant activity or a non-designated task performed by the subject based on a pre-defined sequence of activities and the set of parameters. In accordance with an embodiment, the recommended corrective action may be rendered as feedback on the portable device in a predefined mode.

In accordance with an embodiment, the notification may be further generated based on a breach of an outermost sterile field, such as the first OSF 420a, inner sterile fields, such as the first ISF 420b, and a critical sterile field, such as the first CSF 420c, around a sterile object, such as the OR bed 404a, based on distance data between the sterile object, i.e., the OR bed 404a, and the unauthorized subject, such as one of the plurality of clinicians 408a, . . . , 408c and the non-clinician 408d.

In accordance with an embodiment, the generated notification may be rendered at the portable device, such as one of the plurality of portable electronic devices 412a, . . . , 412c, at a basic alert level based on breach of the outermost sterile field, such as the first OSF 420a, around the sterile object, i.e., the OR bed 404a.

In accordance with an embodiment, the generated notification may be rendered at the portable device 230, such as one of the plurality of portable electronic devices 412a, . . . , 412c, and additional portable devices at advanced alert levels based on breach of the inner sterile fields, such as the first ISF 420b, and the critical sterile field, such as the first CSF 420c, around the sterile object, i.e., the OR bed 404a.

In accordance with an embodiment, the notification may be generated as feedback, via a plurality of output devices in accordance with a predefined mode, based on at least one of the detection of the event associated with the unauthorized action performed by the unauthorized subject or the breach of the outermost sterile field, such as the first OSF 420a, the inner sterile fields, such as the first ISF 420b, and the critical sterile field, such as the first CSF 420c, around the sterile object, such as the OR bed 404a, based on the distance data between the sterile object, i.e., the OR bed 404a, and the unauthorized subject.

In accordance with an embodiment, the plurality of output devices may comprise the portable device associated with the unauthorized subject, another portable device associated with another subject related to the unauthorized subject, and the user interface 228 associated with the external sterile manager 236.

In accordance with an embodiment, the outermost sterile field, such as the first OSF 420a, the inner sterile fields, such as the first ISF 420b, and the critical sterile field, such as the first CSF 420c, may be adjustable and defined dynamically.

In accordance with various embodiment, the outermost sterile field, such as the first OSF 420a, the inner sterile fields, such as the first ISF 420b, have a uniform or a non-uniform boundary based on a plurality of characteristics of a third modality of sensing devices, such as the distance sensors 214.

Various embodiments of the disclosure may provide a computer-readable medium, such as the non-transitory computer-readable medium 506, having stored thereon, computer implemented instruction that when executed by the processor 504 causes the SFC system 102 to execute operations for maintaining sterile fields in the monitored enclosure. In accordance with an embodiment, the processor 504 causes the SFC system 102 to execute operations to correlate multi-modal sensor data associated with an exemplary subject, such as the subject 232, performing a set of activities within the monitored enclosure, such as the operating room 402. The multi-modal sensor data may be received at defined time intervals from a plurality of sensing devices, such as the indoor positioning system 204, the optical sensing devices 210, and the distance sensors 214, located within the monitored enclosure, such as the operating room 402. The processor 504 causes the SFC system 102 to further execute operations to authorize the exemplary subject, such as the subject 232, to selectively perform a set of designated tasks in response to contextual analysis of the set of activities performed by the exemplary subject, such as the subject 232, based on at least the correlated multi-modal sensor data and the set of parameters retrieved from a data store 226. The processor 504 causes the SFC system 102 to further execute operations to generate a notification, via the portable device 230 associated with an unauthorized subject, based on detection of an event associated with an unauthorized action performed by the unauthorized subject.

The proposed system and method for maintaining sterile fields in a monitored enclosure may be highly advantageous. In existing systems, even with the utmost precautions, breaches in sterile fields may occur that may lead to widespread infections in mass population. For example, according to the Centers for Disease Control and Prevention (CDC), around 1.7 million cases each year are reported in the US alone, and around 100,000 deaths yearly as well due to healthcare-acquired infections alone.

The proposed system and method identify and pre-empts potential breaches of sterile fields and thus, provide an extra layer of protection to the monitored enclosure. The awareness of the sterile fields is accentuated based on basic and advanced alert levels for the subjects so that the subjects maintain a safe distance from sterile objects. As the maintenance of the sterile fields is efficiently taken care of by the proposed system and method, there may be lesser distraction for the team of subjects, for example the surgical team, in the monitored enclosure related to possible breaches of sterile fields. Consequently, the team of subjects is enabled to do corresponding set of activities and designated tasks more efficiently and diligently. As the sterility of the sterile objects is not compromised, the team of subjects may be saved from the additional hassles of re-sterilizing the monitored enclosure. Such an approach further powered by ML and AI engines, as proposed, may help in intelligently deterring the transmission of contaminants to the sterile objects in a much effective manner. For example, in healthcare facilities, healthcare-acquired infections and any associated potential deaths may be averted. On the other hand, the organizations associated with the monitored enclosures may be also saved of unnecessary burden and expense incurred due to occurrence of on-site infections. Further, the set of activities and the designated tasks performed by the subjects within the monitored enclosure may be archived in a repository for future references. Thumbnails and/or markers indicating any event of performing non-compliant activities and/or non-designated tasks by the subjects within the monitored enclosure may also be stored in a separate file in the repository that may be referenced later during audits, inspections or any such sort of monitoring action. Thus, the proposed system and method enables to maintain all the checks and balances within the monitored enclosure by eliminating false positives and ensuring that the sterility of the sterile fields is maintained at all the times.

As utilized herein the terms "circuits" and "circuitry" refer to physical electronic components (for example, hardware) and any software and/or firmware ("code") which may configure the hardware, be executed by the hardware, and/or otherwise be associated with the hardware. As used herein, for example, a particular processor and memory may comprise a first "circuit" when executing first one or more lines of code and may comprise a second "circuit" when executing second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and/or code (if any is necessary) to perform the function, regardless of whether performance of the function is disabled, or not enabled, by some user-configurable setting.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., ASICs, by program instructions being executed by one or more processors, or by a combination of both. Additionally, these sequences of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, which have been contemplated to be within the scope of the claimed subject matter. In addition, for each of the embodiments described herein, the corresponding form of any such embodiments may be described herein as, for example, "logic configured to" perform the described action.

Another embodiment of the disclosure may provide a non-transitory machine and/or computer readable storage and/or media, having stored thereon, a machine code and/or a computer program having at least one code section executable by a machine and/or a computer, thereby causing the machine and/or computer to perform the steps as described herein for maintaining sterile fields in the monitored enclosure.

The present disclosure may also be embedded in a computer program product, which comprises all the features enabling the implementation of the methods described herein, and which when loaded in a computer system is able to conduct these methods. Computer program in the present context means any expression, in any language, code or notation, either statically or dynamically defined, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithms, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, physical and/or virtual disk, a removable disk, a CD-ROM, virtualized system, or device such as a virtual servers or container, or any other form of storage medium known in the art. An exemplary storage medium is communicatively coupled to the processor (including logic/code executing in the processor) such that the processor can read information from, and write information to, the storage medium. In the alternative, the storage medium may be integral to the processor.

While the present disclosure has been described with reference to certain embodiments, it will be noted understood by, for example, those skilled in the art that various changes and modifications could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated. Therefore, it is intended that the present disclosure is not limited to the particular embodiment disclosed, but that the present disclosure will include all embodiments falling within the scope of the appended claims.

What is claimed is:

1. A system, comprising:
   an indoor positioning subsystem that includes:
   a plurality of fixed lamps deployed within a monitored enclosure, wherein each of the plurality of fixed lamps is driven with a corresponding flicker-encoding pattern from a plurality of flicker-encoding patterns, and each of the plurality of flicker-encoding patterns is inter-distinct; and
   at least one optical sensor, carried by a subject within the monitored enclosure, configured to:
   receive modulated light emitted by the plurality of fixed lamps;
   demodulate the received modulated light to identify a dominant flicker-encoding pattern present in the received modulated light; and
   generate location data that associates the at least one optical sensor with a vicinity of a fixed lamp of the plurality of fixed lamps that is associated with the dominant flicker-encoding pattern;
   a memory for storing instructions; and
   a processor configured to execute the instructions, and based on the executed instructions, the processor is further configured to:
   receive the location data generated by the at least one optical sensor of the indoor positioning subsystem;
   receive multi-modal sensor data associated with the subject at defined time intervals from the indoor positioning subsystem and a plurality of sensing devices located within the monitored enclosure;
   correlate the received multi-modal sensor data, associated with the subject that executes a plurality of actions within the monitored enclosure, to determine a movement pattern of the subject;
   execute contextual analysis of the correlated multi-modal sensor data based on a set of defined parameters retrieved from a data store and a trained classification model;
   authorize the subject to selectively execute a set of designated tasks based on the contextual analysis which includes statistical prediction by the trained classification model indicating whether the movement pattern corresponds to a permissible or non-permissible action;
   detect an event associated with an unauthorized action executed by an unauthorized subject; and
   generate a notification, via a portable device associated with the unauthorized subject, based on the detection of the event, wherein the notification is rendered in a defined mode at a basic alert level or an advanced alert level based on a distance-based breach of at least one sterile field around a sterile object.

2. The system according to claim 1, wherein
the set of defined parameters comprises defined rules associated with each of the set of designated tasks retrieved from the data store, a list of responsibility exclusions defined for the subject, a set of protocols pertaining to responsibilities and duties defined for the subject in a workflow, and identification data and credentials read from the portable device associated with by the subject.

3. The system according to claim 1, wherein the correlated multi-modal sensor data corresponds to location data of the subject, gestures executed by identified subject, and distance data that pertains to distance of the subject with respect to the sterile object within the monitored enclosure.

4. The system according to claim 1, wherein the plurality of actions comprises the set of activities and the set of designated tasks, and
wherein the unauthorized action executed by the unauthorized subject corresponds to at least one of a non-compliant activity or a non-designated task.

5. The system according to claim 1, wherein
the processor is further configured to receive the location data of the subject within the monitored enclosure from a first modality of sensing devices, and
the first modality of sensing devices corresponds to the indoor positioning subsystem.

6. The system according to claim 5, wherein the indoor positioning subsystem corresponds to at least one of an electromagnetic radiation-based system, sound-based system, radio frequency-based system, or non-radio frequency-based system.

7. The system according to claim 1, wherein
the processor is further configured to receive optical sensor data associated with the subject within the monitored enclosure from a second modality of sensing devices,
the second modality of sensing devices corresponds to optical sensing devices, and
the optical sensor data is transformed into a vector space to identify gestures executed by the subject within the monitored enclosure.

8. The system according to claim 1, wherein
the processor is further configured to receive distance data of the subject with respect to the sterile object from a third modality of sensing devices,
the third modality of sensing devices corresponds to distance sensors, and
the distance sensors are installed at outer boundary of the sterile object.

9. The system according to claim 1, wherein the processor is further configured to:
train a classification model based on training datasets pertaining to the movement pattern or the plurality of actions derived from the correlated multi-modal sensor data; and
generate a prediction about likelihood of an input action being classified with an output classification label based on the trained classification model.

10. The system according to claim 1, wherein
the processor is further configured to recommend a corrective action to be taken corresponding to a non-compliant activity or a non-designated task performed by the subject based on a pre-defined sequence of activities and the set of defined parameters, and
the recommended corrective action is rendered as feedback on the portable device in a predefined mode.

11. The system according to claim 1, wherein the notification is further generated based on a breach of at least one of an outermost sterile field, inner sterile fields, or a critical sterile field around the sterile object based on distance data between the sterile object and the unauthorized subject.

12. The system according to claim 11, wherein
the generated notification is rendered at the portable device at the basic alert level based on the breach of the outermost sterile field around the sterile object,
the generated notification is rendered at the portable device and additional portable devices at the advanced alert level based on the breach of the inner sterile fields and the critical sterile field around the sterile object,
the notification is generated as feedback, rendered via a plurality of output devices in the defined mode, based on at least one of the detection of the event associated with the unauthorized action executed by the unauthorized subject or the breach of the outermost sterile field, the inner sterile fields and the critical sterile field around the sterile object based on the distance data between the sterile object and the unauthorized subject, and
the plurality of output devices comprises the portable device associated with the unauthorized subject, a new portable device associated with a new subject related to the unauthorized subject, and a user interface component associated with an external sterile manager.

13. The system according to claim 12, wherein
the outermost sterile field, the inner sterile fields, and the critical sterile field are adjustable and defined dynamically, and
the outermost sterile field and the inner sterile fields have a uniform, or a non-uniform boundary based on a plurality of characteristics of a third modality of sensing devices.

14. A method, comprising:
receiving, by at least one optical sensor carried by a subject within a monitored enclosure, modulated light emitted by a plurality of fixed lamps, wherein
each of the plurality of fixed lamps is driven with a corresponding flicker-encoding pattern from a plurality of flicker-encoding patterns, and
each of the plurality of flicker-encoding patterns is inter-distinct;
demodulating, by the at least one optical sensor, the received modulated light to identify a dominant flicker-encoding pattern present in the modulated received light;
generating, by the at least one optical sensor, location data that associates the at least one optical sensor with a vicinity of a fixed lamp of the plurality of fixed lamps that is associated with the dominant flicker-encoding pattern;
receiving, by a processor, the location data generated by the at least one optical sensor of an indoor positioning subsystem;
receiving, by the processor, multi-modal sensor data associated with the subject at defined time intervals from the indoor positioning subsystem and a plurality of sensing devices located within the monitored enclosure;
correlating, by the processor, the received multi-modal sensor data, associated with the subject that executes a plurality of actions within the monitored enclosure, to determine a movement pattern of the subject;
executing, by the processor, contextual analysis of the correlated multi-modal sensor data based on a set of defined parameters retrieved from a data store and a trained classification model;
authorizing, by the processor, the subject to selectively execute a set of designated tasks based on the contextual analysis which includes statistical prediction by the trained classification model indicating whether the movement pattern corresponds to a permissible or non-permissible action;
detecting, by the processor, an event associated with an unauthorized action executed by an unauthorized subject; and
generating, by the processor, a notification, via a portable device associated with the unauthorized subject, based on the detection of the event, wherein the notification is rendered in a defined mode at a basic alert level or an advanced alert level based on a distance-based breach of at least one sterile field around a sterile object.

15. The method according to claim 14, further comprising receiving, by the processor, the location data of the subject within the monitored enclosure from a first modality of sensing devices,
wherein the first modality of sensing from the indoor positioning subsystem and corresponds to the indoor positioning subsystem.

16. The method according to claim 14, further comprising receiving, by the processor, optical sensor data associated with the subject within the monitored enclosure from a second modality of sensing devices, wherein
- the second modality of sensing devices corresponds to optical sensing devices, and
- the optical sensor data is transformed into a vector space to identify gestures executed by the subject within the monitored enclosure.

17. The method according to claim 14, further comprising receiving, by the processor, distance data of the subject with respect to the sterile object from a third modality of sensing devices, wherein
- the third modality of sensing devices corresponds to distance sensors, and
- the distance sensors are installed at outer boundary of the sterile object.

18. The method according to claim 14, further comprising:
- training, by the processor, a classification model based on training datasets pertaining to the movement pattern or the plurality of actions derived from the correlated multi-modal sensor data; and
- generating, by the processor, a prediction about likelihood of an input action being classified with an output classification label based on the trained classification model.

19. The method according to claim 14, further comprising recommending, by the processor, a corrective action to be taken corresponding to a non-compliant activity or a non-designated task executed by the subject based on a defined sequence of activities and the set of defined parameters,
- the recommended corrective action is rendered as feedback on the portable device in the defined mode.

20. The method according to claim 14, wherein
- the notification is further generated based on a breach of at least one of an outermost sterile field, inner sterile fields, or a critical sterile field around the sterile object based on distance data between the sterile object and the unauthorized subject,
- the generated notification is rendered at the portable device at the basic alert level based on the breach of the outermost sterile field around the sterile object,
- the generated notification is rendered at the portable device and additional portable devices at the advanced alert level based on the breach of the inner sterile fields and the critical sterile field around the sterile object,
- the outermost sterile field, the inner sterile fields, and the critical sterile field are adjustable and defined dynamically, and
- the outermost sterile field and the inner sterile fields have a uniform, or a non-uniform boundary based on a plurality of characteristics of a third modality of sensing devices.

21. The method according to claim 20, wherein
the notification is generated as feedback, via a plurality of output devices in the defined mode, based on at least one of the detection of the event associated with the unauthorized action executed by the unauthorized subject or the breach of the outermost sterile field, the inner sterile fields and the critical sterile field around the sterile object based on the distance data between the sterile object and the unauthorized subject, and
wherein the plurality of output devices comprises the portable device associated with the unauthorized subject, a new portable device associated with a new subject related to the unauthorized subject, and a user interface component associated with an external sterile manager.

22. A non-transitory computer-readable medium having stored thereon, computer implemented instruction that when executed by a processor in a computer, causes the computer to execute operations, the operations comprising:
- receiving location data generated by at least one optical sensor, of an indoor positioning subsystem, carried by a subject within a monitored enclosure, wherein the at least one optical sensor
  - receives modulated light emitted by a plurality of fixed lamps deployed within the monitored enclosure, wherein
    - each of the plurality of fixed lamps is driven with a corresponding flicker-encoding pattern from a plurality of flicker-encoding patterns, and
    - each of the plurality of flicker-encoding patterns is inter-distinct,
  - demodulates the received modulated light to identify a dominant flicker-encoding pattern present in the modulated received light, and
  - generates the location data that associates the at least one optical sensor with a vicinity of a fixed lamp of the plurality of fixed lamps that is associated with the dominant flicker-encoding pattern;
- receiving multi-modal sensor data associated with the subject at defined time intervals from the indoor positioning subsystem and a plurality of sensing devices located within the monitored enclosure;
- correlating the received multi-modal sensor data, associated with the subject that executes a plurality of actions within the monitored enclosure, to determine a movement pattern of the subject;
- executing contextual analysis of the correlated multi-modal sensor data based on a set of defined parameters retrieved from a data store and a trained classification model;
- authorizing the subject to selectively execute a set of designated tasks based on the contextual analysis which includes statistical prediction by the trained classification model indicating whether the movement pattern corresponds to a permissible or non-permissible action;
- detecting an event associated with an unauthorized action executed by an unauthorized subject; and
- generating a notification, via a portable device associated with the unauthorized subject, based on the detection of the event, wherein the notification is rendered in a defined mode at a basic alert level or an advanced alert level based on a distance-based breach of at least one sterile field around a sterile object.

* * * * *